(12) United States Patent
Juikar et al.

(10) Patent No.: US 7,868,090 B2
(45) Date of Patent: *Jan. 11, 2011

(54) POLYESTER MOLDING COMPOSITIONS

(75) Inventors: Vishvajit Chandrakant Juikar, Karnataka (IN); Sreepadaraj Karanam, Bergen op Zoom (NL)

(73) Assignee: SABIC Innovative Plastics IP B.V. (NL)

( * ) Notice: Subject to any disclaimer, the term of this patent is extended or adjusted under 35 U.S.C. 154(b) by 268 days.

This patent is subject to a terminal disclaimer.

(21) Appl. No.: 11/616,967

(22) Filed: Dec. 28, 2006

(65) Prior Publication Data

US 2008/0161468 A1    Jul. 3, 2008

(51) Int. Cl.
*C08L 27/12* (2006.01)
*C08L 67/02* (2006.01)
*C08L 67/03* (2006.01)

(52) U.S. Cl. .................. 525/121; 525/166; 525/199; 525/438; 525/445

(58) Field of Classification Search .................. 525/167
See application file for complete search history.

(56) References Cited

U.S. PATENT DOCUMENTS

| | | | |
|---|---|---|---|
| 3,078,254 A | 2/1963 | Zelinski et al. | |
| 3,265,765 A | 8/1966 | Holden et al. | |
| 3,297,793 A | 1/1967 | Dollinger | |
| 3,402,159 A | 9/1968 | Hsieh | |
| 3,405,198 A | 10/1968 | Rein et al. | |
| 3,594,452 A | 7/1971 | De La Mare et al. | |
| 3,769,260 A | 10/1973 | Segal | |
| 3,864,428 A | 2/1975 | Nakamura et al. | |
| 3,953,404 A | 4/1976 | Borman | |
| 4,119,607 A | 10/1978 | Gergen et al. | |
| 4,172,859 A | 10/1979 | Epstein | |
| 4,264,487 A | 4/1981 | Fromuth et al. | |
| 4,292,233 A | 9/1981 | Binsack et al. | |
| 4,327,764 A | 5/1982 | Biederman | |
| 4,364,280 A | 12/1982 | Kutsay | |
| 4,579,906 A | 4/1986 | Zabrocki et al. | |
| 4,810,739 A | 3/1989 | Lindner et al. | |
| 5,804,654 A * | 9/1998 | Lo et al. | 525/67 |
| 5,879,791 A | 3/1999 | Kato et al. | |
| 6,100,366 A | 8/2000 | Nakata et al. | |
| 6,537,404 B1 * | 3/2003 | Ishiwatari et al. | 156/78 |
| 6,660,869 B2 | 12/2003 | Van Benthem et al. | |
| 2006/0074155 A1 * | 4/2006 | Wit et al. | 524/115 |

FOREIGN PATENT DOCUMENTS

| | | |
|---|---|---|
| EP | 0386916 | 9/1990 |
| EP | 1449871 | 8/2004 |
| EP | 1486536 | 12/2004 |
| GB | 1264741 | 2/1972 |
| WO | WO 03/066704 | 8/2003 |

OTHER PUBLICATIONS

Synthesis, vol. 12, p. 963 to 965, 1981.
Chemical Review, 54, 593-613 (1954).

* cited by examiner

*Primary Examiner*—Randy Gulakowski
*Assistant Examiner*—Mike Dollinger

(57) ABSTRACT

A polyester composition comprising (a) a polyester derived from a diol and a diacid, (b) a fluoropolymer and (c) a carboxy reactive compound, where the polyester composition has a highly useful combination of (i) mechanical properties and (ii) melt strength is disclosed. Also disclosed is a process to prepare these compositions and articles therefrom.

27 Claims, No Drawings

POLYESTER MOLDING COMPOSITIONS

BACKGROUND OF THE INVENTION

The invention relates to polyester compositions, methods to synthesize the compositions and articles made from the compositions.

Many polymer-based articles are manufactured by injection-molding, blow-molding or other molding processes. These molding techniques require the polymer system to have adequate melt strength and viscosity. Generally, polyesters having relatively high molecular weight have poor flow properties. High molecular weight polyesters can be made suitable for injection molding by solid phase polymerization of polymers, but this operation raises the cost of the polyesters substantially. Polyesters having relatively low viscosities generally have flow properties that are better than polyesters having relatively higher viscosities. However, polyesters having relatively lower viscosities have been found to produce articles with poorer mechanical properties.

In order to obtain polyesters having commercially useful mechanical properties such as high modulus, different approaches have been tried. For instance, fillers have been used to reinforce polyesters. However, addition of fillers often leads to brittleness and failure of the polymer, which can lower the impact strength of the resin. Addition of fillers can also cause processing difficulties, due at least in part to lack of compatibility of the filler with the polymer matrix and such incompatibility can also result in molding and flow-related problems. Although the use of impact modifiers in such compositions can improve impact properties, the use of impact modifiers has not been found effective in producing polyester having a combination of both useful tensile modulus and impact properties.

Inorganic fillers, which are used to reinforce polymers, affect the impact properties of molding compositions. However, when an organic filler, particularly, polytetrafluoroethylene (PTFE) is used as a filler, impact properties are impaired such that impact properties are lower than that with other mineral or glass fillers. Polytetrafluoroethylene (PTFE) fibers have also been used as fillers in polymer compositions to obtain polyesters having improved tensile modulus-ductility properties balance with some success. Unfortunately, the fibers can aggregate in the matrix resin, making it very difficult to obtain a uniform composition. Such compositions are not known to produce polyesters having a combination of both useful tensile modulus and impact properties.

Polytetrafluoroethylene and other fluoropolymers, sometimes used as fillers, have also been used as additives in thermoplastic polymers in order to improve certain properties of the polymers. The use of relatively small amounts, e.g., from about 0.1 to about 1 percent by weight, of a fluoropolymer as an anti-drip additive in flame retardant grades of thermoplastic resin molding compositions is described, for example, in U.S. Pat. Nos. 4,810,739, 4,579,906, and 4,810,739. The use of sintered PTFE in highly filled thermoplastic compositions as low friction additives is disclosed in U.S. Pat. No. 5,879,791. A drawback to the use of fluoropolymer additives exists, however, in that such additives have poor dispersibility in many polymers. Such compositions are not known to produce polyesters having a combination of both useful tensile modulus and impact properties.

For the foregoing reasons, there is an unmet need to develop a polyester composition that can provide a balanced combination of tensile modulus and impact properties.

For the foregoing reasons, there is an unmet need to develop methods for making polyester compositions that can provide a balanced set of tensile modulus and impact properties.

For the foregoing reasons, there is an unmet need to develop articles derived from such polyester compositions that can provide a balanced set of tensile modulus and impact properties.

For the foregoing, industry to develop technologies that can provide molding compositions having useful mechanical properties with polyesters, e.g., low molecular weight polyesters.

For the foregoing reasons, there is a need in the industry to provide compositions based on low molecular weight polyesters with useful mechanical properties including desired balance of tensile modulus and ductility properties.

BRIEF DESCRIPTION OF THE INVENTION

According to one embodiment of the present invention, the invention relates to a composition of matter comprising:
 a. a polyester derived from a diol and a diacid,
 b. a fluoropolymer
 c. and a carboxy reactive compound, wherein the polyester, the fluoropolymer, and the carboxy reactive compound are present in sufficient amounts for the composition to have at least 20% higher impact strength as measured at ambient temperature in accordance with ISO 180 test method, and at least 20% higher tensile elongation at break as measured in accordance with ISO-527 test method, as compared to a composition containing the polyester and either the fluoropolymer or the carboxy reactive compound.

In another embodiment, the invention relates to a process comprising: mixing a polyester, a fluoropolymer and a carboxy reactive compound effective to form the polyester composition having: at least 20% higher impact strength as measured at ambient temperature in accordance with ISO 180 test method, and at least 20% higher tensile elongation at break as measured in accordance with ISO-527 test method, relative to a composition consisting of the polyester and only the fluoropolymer or the carboxy reactive compound.

In another embodiment, the invention relates to an article molded from such a composition.

In another embodiment, the invention relates to a method of making an article by extruding, molding, or shaping the above-described compositions into an article.

And in another embodiment, the invention relates to a composition of matter comprising
 a. from 60 to 99 weight percent a polyester of intrinsic viscosity in the range from 0.3 to 0.8 dl/g,
 b. from Ito 8 weight percent a fluoropolymer;
 c. from 0.2 to 15 weight percent a carboxy reactive compound; and
 d. from 0 to 40 weight percent a thermoplastic resin having an intrinsic viscosity greater than at least 0.8 dl/g, wherein the composition has at least 20% higher impact strength as measured at ambient temperature in accordance with ISO 180 test method, and at least 20% higher tensile elongation at break as measured in accordance with ISO-527 test method, relative to a composition consisting of the polyester and only the fluoropolymer or the carboxy reactive compound.

Various other features, aspects, and advantages of the present invention will become more apparent with reference to the following description, examples, and appended claims.

DETAILED DESCRIPTION OF THE INVENTION

The invention is based on the discovery that it is now possible to make a polyester composition from a certain combination of a polyester, a fluoropolymer and a carboxy reactive compound, (and an article from the composition), which can impart a combination of useful impact strength and tensile elongation properties (a balanced combination of properties). These properties are very useful in a variety of applications, e.g., automotive parts such as hoods, bumpers, and other articles.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

"Combination" as used herein includes mixtures, copolymers, reaction products, blends, composites, and the like.

Other than the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein the term "aliphatic radical" refers to a radical having a valence of at least one comprising a linear or branched array of atoms which is not cyclic. The array may include heteroatoms such as nitrogen, sulfur, silicon, selenium and oxygen or can be composed exclusively of carbon and hydrogen. Aliphatic radicals can be "substituted" or "unsubstituted". A substituted aliphatic radical is defined as an aliphatic radical which comprises at least one substituent. A substituted aliphatic radical may comprise as many substituents as there are positions available on the aliphatic radical for substitution. Substituents which can be present on an aliphatic radical include but are not limited to halogen atoms such as fluorine, chlorine, bromine, and iodine. Substituted aliphatic radicals include trifluoromethyl, hexafluoroisopropylidene, chloromethyl; difluorovinylidene; trichloromethyl, bromoethyl, bromotrimethylene (e.g. —$CH_2CHBrCH_2$—), and the like. For convenience, the term "unsubstituted aliphatic radical" is defined herein to encompass, as part of the "linear or branched array of atoms which is not cyclic" comprising the unsubstituted aliphatic radical, a wide range of functional groups. Examples of unsubstituted aliphatic radicals include allyl, aminocarbonyl (i.e. —$CONH_2$), carbonyl, dicyanoisopropylidene (i.e. —$CH_2C(CN)_2CH_2$—), methyl (i.e. —$CH_3$), methylene (i.e. —$CH_2$—), ethyl, ethylene, formyl, hexyl, hexamethylene, hydroxymethyl (i.e. —$CH_2OH$), mercaptomethyl (i.e. —$CH_2SH$), methylthio (i.e. —$SCH_3$), methylthiomethyl (i.e. —$CH_2SCH_3$), methoxy, methoxycarbonyl, nitromethyl (i.e. —$CH_2NO_2$), thiocarbonyl, trimethylsilyl, t-butyldimethylsilyl, trimethyoxysilypropyl, vinyl, vinylidene, and the like. Aliphatic radicals are defined to comprise at least one carbon atom. A $C_1$-$C_{10}$ aliphatic radical includes substituted aliphatic radicals and unsubstituted aliphatic radicals containing at least one but no more than 10 carbon atoms.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or can be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having $4n+2$ "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —($CH_2$)$_4$—. Aromatic radicals can be "substituted" or "unsubstituted". A substituted aromatic radical is defined as an aromatic radical which comprises at least one substituent. A substituted aromatic radical may comprise as many substituents as there are positions available on the aromatic radical for substitution. Substituents which can be present on an aromatic radical include, but are not limited to halogen atoms such as fluorine, chlorine, bromine, and iodine. Substituted aromatic radicals include trifluoromethylphenyl, hexafluoroisopropylidenebis(4-phenyloxy) (i.e. —$OPhC(CF_3)_2$PhO—), chloromethylphenyl; 3-trifluorovinyl-2-thienyl; 3-trichloromethylphenyl (i.e. 3-$CCl_3$Ph—), bromopropylphenyl (i.e. Br$CH_2CH_2CH_2$Ph—), and the like. For convenience, the term "unsubstituted aromatic radical" is defined herein to encompass, as part of the "array of atoms having a valence of at least one comprising at least one aromatic group", a wide range of functional groups. Examples of unsubstituted aromatic radicals include 4-allyloxyphenoxy, aminophenyl (i.e. $H_2$NPh—), aminocarbonylphenyl (i.e. $NH_2$COPh—), 4-benzoylphenyl, dicyanoisopropylidenebis (4-phenyloxy) (i.e. —OPhC(CN)$_2$PhO—), 3-methylphenyl, methylenebis(4-phenyloxy) (i.e. —OPh$CH_2$PhO—), ethylphenyl, phenylethenyl, 3-formyl-2-thienyl, 2-hexyl-5-furanyl; hexamethylene-1,6-bis(4-phenyloxy) (i.e. —OPh($CH_2$)$_6$PhO—); 4-hydroxymethylphenyl (i.e. 4-HOC$H_2$Ph—), 4-mercaptomethylphemyl (i.e. 4-HS$CH_2$Ph—), 4-methylthiophenyl (i.e. 4-$CH_3$SPh—), methoxyphenyl, methoxycarbonylphenyloxy (e.g. methyl salicyl), nitromethylphenyl (i.e. —Ph$CH_2NO_2$), trimethylsilylphenyl, t-butyldimethylsilylphenyl, vinylphenyl, vinylidenebis(phenyl), and the like. The term "a $C_3$-$C_{10}$ aromatic radical" includes substituted aromatic radicals and unsubstituted aromatic radicals containing at least three but no more than 10 carbon atoms. The aromatic radical 1-imidazolyl ($C_3H_2N_2$—) represents a $C_3$ aromatic radical. The benzyl radical ($C_7H_8$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethy group ($C_6H_{11}CH_2$—) is an cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or can be composed exclusively of carbon and hydrogen. Cycloaliphatic radicals can be "substituted" or "unsubstituted." A substituted cycloaliphatic radical is defined as a cycloaliphatic radical, which comprises at least one substituent. A substituted cycloaliphatic radical may comprise as many substituents as there are positions available on the cycloaliphatic radical for substitution. Substituents, which can be present on a cycloaliphatic radical include but are not limited to halogen atoms such as fluorine, chlorine, bromine, and iodine. Substituted cycloaliphatic radicals include trifluoromethylcyclohexyl, hexafluoroisopropylidenebis(4-cyclohexyloxy) (i.e. —OC$_6$H$_{11}$C(CF$_3$)$_2$ C$_6$H$_{11}$O—), chloromethylcyclohexyl; 3-trifluorovinyl-2-cyclopropyl; 3-trichloromethylcyclohexyl (i.e. 3-CCl$_3$C$_6$H$_{11}$—), bromopropylcyclohexyl (i.e. BrCH$_2$CH$_2$CH$_2$C$_6$H$_{11}$—), and the like. For convenience, the term "unsubstituted cycloaliphatic radical" is defined herein to encompass a wide range of functional groups. Examples of unsubstituted cycloaliphatic radicals include 4-allyloxycyclohexyl, aminocyclohexyl (i.e. H$_2$N C$_6$H$_{11}$—), aminocarbonylcyclopenyl (i.e. NH$_2$COC$_5$H$_9$—), 4-acetyloxycyclohexyl, dicyanoisopropylidenebis(4-cyclohexyloxy) (i.e. —OC$_6$H$_{11}$C(CN)$_2$C$_6$H$_{11}$O—), 3-methylcyclohexyl, methylenebis(4-cyclohexyloxy) (i.e. —OC$_6$H$_{11}$CH$_2$C$_6$H$_{11}$O—), ethylcyclobutyl, cyclopropylethenyl, 3-formyl-2-terahydrofuranyl, 2-hexyl-5-tetrahydrofuranyl; hexamethylene-1,6-bis (4-cyclohexyloxy) (i.e. —OC$_6$H$_{11}$(CH$_2$)$_6$ C$_6$H$_{11}$O—); 4-hydroxymethylcyclohexyl (i.e. 4-HOCH$_2$C$_6$H$_{11}$—), 4-mercaptomethylcyclohexyl (i.e. 4-HSCH$_2$C$_6$H$_{11}$—), 4-methylthiocyclohexyl (i.e. 4-CH$_3$SC$_6$H$_{11}$—), 4-methoxycyclohexyl, 2-methoxycarbonylcyclohexyloxy (2-CH$_3$OCO C$_6$H$_{10}$—), nitromethylcyclohexyl (i.e. NO$_2$CH$_2$C$_6$H$_{10}$—), trimethylsilylcyclohexyl, tbutyldimethylsilylcyclopentyl, 4-trimethoxysilyethylcyclohexyl (e.g. (CH$_3$O)$_3$SiCH$_2$ CH$_2$C$_6$H$_{10}$—), vinylcyclohexenyl, vinylidenebis(cyclohexyl), and the like. The term "a C$_3$-C$_{10}$ cycloaliphatic radical" includes substituted cycloaliphatic radicals and unsubstituted cycloaliphatic radicals containing at least three but no more than 10 carbon atoms. The cycloaliphatic radical 2-tetrahydrofuranyl (C$_4$H$_7$O—) represents a C$_4$-cycloaliphatic radical. The cyclohexylmethyl radical (C$_6$H$_{11}$CH$_2$—) represents a C$_7$ cycloaliphatic radical.

The present invention relates to a polyester composition with a highly useful combination of (i) mechanical properties and (ii) melt strength. Such a combination of properties is obtained by enhancing the fibrillation of the fluoropolymer in polyesters by addition of carboxy reactive compound.

According to one embodiment of the present invention, a polyester composition comprises (a) a polyester, (b) fluoropolymer and (c) a carboxy reactive compound, wherein the composition has at least about 20% higher impact strength as measured at room/ambient temperature in accordance with ISO 180 test method, and at least about 20% higher tensile elongation at break at a rate of pull of 50 mm/minute as measured in accordance with ISO-527 test method, relative to a composition consisting of the polyester and only the fluoropolymer or the carboxy reactive compound is disclosed.

Typically, polyester resins include crystalline polyester resins such as polyester resins derived from at least one diol, and at least one dicarboxylic acid. Preferred polyesters have repeating units according to structural formula (I)

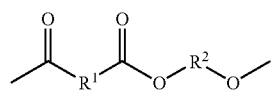

(I)

wherein, R$^1$ and R$^2$ are independently at each occurrence a aliphatic, aromatic and cycloaliphatic radical. In one embodiment R$^2$ is an alkyl radical comprising a dehydroxylated residue derived from an aliphatic or cycloaliphatic diol, or mixtures thereof, containing from 2 to about 20 carbon atoms and R$^1$ is an aromatic radical comprising a decarboxylated residue derived from an aromatic dicarboxylic acid. The polyester is a condensation product where R$^2$ is the residue of an aromatic, aliphatic or cycloaliphatic radical containing diol having C$_1$ to C$_{30}$ carbon atoms or chemical equivalent thereof, and R$^1$ is the decarboxylated residue derived from an aromatic, aliphatic or cycloaliphatic radical containing diacid of C$_1$ to C$_{30}$ carbon atoms or chemical equivalent thereof. The polyester resins are typically obtained through the condensation or ester interchange polymerization of the diol or diol equivalent component with the diacid or diacid chemical equivalent component.

The diacid includes carboxylic acids having two carboxyl groups each useful in the preparation of the polyester resins of the present invention are preferably aliphatic, aromatic, cycloaliphatic. Examples of diacids are cyclo or bicyclo aliphatic acids, for example, decahydro naphthalene dicarboxylic acids, stilbene dicarboxylic acid, norbornene dicarboxylic acids, bicyclo octane dicarboxylic acids, 1,4-cyclohexanedicarboxylic acid or chemical equivalents, and most preferred is trans-1,4-cyclohexanedicarboxylic acid or a chemical equivalent. Linear dicarboxylic acids like adipic acid, azelaic acid, dicarboxyl dodecanoic acid, and succinic acid may also be useful. Chemical equivalents of these diacids include esters, aliphatic esters, e.g., dialiphatic esters, diaromatic esters, anhydrides, salts, acid chlorides, acid bromides, and the like. Examples of aromatic dicarboxylic acids from which the decarboxylated residue R$^1$ can be derived are acids that contain a single aromatic ring per molecule such as, e.g., isophthalic or terephthalic acid, 1,2-di(p-carboxyphenyl) ethane, 4,4'-dicarboxydiphenyl ether, 4,4'-bisbenzoic acid and mixtures thereof, as well as acids contain fused rings such as, e.g. 1,4-, 1,5-, or 2,6-naphthalene dicarboxylic acids. Preferred dicarboxylic acids include terephthalic acid, isophthalic acid, stilbene dicarboxylic acids, naphthalene dicarboxylic acids, and the like, and mixtures comprising at least one of the foregoing dicarboxylic acids.

Examples of these polyvalent carboxylic acids include, but are not limited to, an aromatic polyvalent carboxylic acid, an aromatic oxycarboxylic acid, an aliphatic dicarboxylic acid, and an alicyclic dicarboxylic acid, including terephthalic acid, isophthalic acid, ortho-phthalic acid, 1,5-naphthalenedicarboxylic acid, 2,6-naphthalenedicarboxylic acid, diphenic acid, sulfoterephthalic acid, 5-sulfoisophthalic acid, 4-sulfophthalic acid, 4-sulfonaphthalene 2,7-dicarboxylic acid, 5-[4-sulfophenoxy] isophthalic acid, sulfoterephthalic acid, p-oxybenzoic acid, p-(hydroxyethoxy)benzoic acid, succinic acid, adipic acid, azelaic acid, sebacic acid, dodecanedicarboxylic acid, fumaric acid, maleic acid, itaconic acid, hexahydrophthalic acid, tetrahydrophthalic acid, trimellitic acid, trimesic acid, and pyrromellitic acid. These can be used in the form of metal salts and ammonium salts and the like.

In a preferred embodiment, the diacid is selected from the group consisting of linear acids, terephthalic acids, isophthalic acids, phthalic acids, naphthalic acids, cycloaliphatic acids, bicyclo aliphatic acids, decahydro naphthalene dicarboxylic acids, norbornene dicarboxylic acids, bicyclo octane dicarboxylic acids, 1,4-cyclohexanedicarboxylic acid, adipic acid, azelaic acid, dicarboxyl dodecanoic acid, stilbene dicarboxylic acid, succinic acid, chemical equivalents of the foregoing, and combinations thereof. In yet another embodiment, the diacid is selected from the group consisting of linear acids, terephthalic acids, isophthalic acids, phthalic acids, naphthalic acids, cycloaliphatic acids, bicyclo aliphatic acids, decahydro naphthalene dicarboxylic acids, norbornene dicarboxylic acids, bicyclo octane dicarboxylic acids, 1,4-cyclohexanedicarboxylic acid, adipic acid, azelaic acid, dicarboxyl dodecanoic acid, stilbene dicarboxylic acid, succinic acid, chemical equivalents of the foregoing, and combinations thereof.

In one embodiment, the diol is at least one selected from the group consisting of ethylene glycol, propylene glycol, butanediol, xylene glycol and chemical equivalents of the same. Chemical equivalents to the diols include esters, such as dialkylesters, diaryl esters, and the like. In another embodiment, there can be additional diols present, which can be straight chain, branched, or cycloaliphatic diols and may contain from 2 to 12 carbon atoms. Examples of such diols include but are not limited to ethylene glycol, propylene glycol, i.e., 1,2- and 1,3-propylene glycol, 2,2-dimethyl-1,3-propane diol 2-ethyl, 2-methyl, 1,3-propane diol, 1,3- and 1,5-pentane diol, dipropylene glycol, 2-methyl-1,5-pentane diol, 1,6-hexane diol, dimethanol decalin, dimethanol bicyclo octane, 1,4-cyclohexane dimethanol and particularly its cis- and trans-isomers, triethylene glycol, 1,10-decane diol, and mixtures of any of the foregoing. In one embodiment, the diol include glycols, such as ethylene glycol, propylene glycol, butanediol, hydroquinone, resorcinol, trimethylene glycol, 2-methyl-1,3-propane glycol, 1,4-butanediol, hexamethylene glycol, xylene glycol, decamethylene glycol, 1,4-cyclohexane dimethanol, or neopentylene glycol.

In yet another embodiment, the additional diols include polyvalent alcohols that include, but are not limited to, an aliphatic polyvalent alcohol, an alicyclic polyvalent alcohol, and an aromatic polyvalent alcohol, including ethylene glycol, propylene glycol, 1,3-propanediol, 2,3-butanediol, 1,4-butanediol, 1,5-pentanediol, 1,6-hexanediol, neopentyl glycol, diethylene glycol, dipropylene glycol, 2,2,4-trimethyl-1,3-pentanediol, polyethylene glycol, polypropylene glycol, polytetramethylene glycol, trimethylolethane, trimethylolpropane, glycerin, pentaerythritol, 1,4-cyclohexanediol, 1,4-cyclohexanedimethanol, spiroglycol, tricyclodecanediol, tricyclodecanedimethanol, m-xylene glycol, o-xylene glycol, p-xylene glycol, 1,4-phenylene glycol, bisphenol A, lactone polyester and polyols. Further, with respect to the polyester resin obtained by polymerizing the polybasic carboxylic acids and the polyhydric alcohols either singly or in combination respectively, a resin obtained by capping the polar group in the end of the polymer chain using an ordinary compound capable of capping an end can also be used.

Block copolyester resin components are also useful, and can be prepared by the transesterification of (a) straight or branched chain poly(alkylene terephthalate) and (b) a copolyester of a linear aliphatic dicarboxylic acid and, optionally, an aromatic dibasic acid such as terephthalic or isophthalic acid with one or more straight or branched chain dihydric aliphatic glycols. Especially useful when high melt strength is important are branched high melt viscosity resins, which include a small amount of, e.g., up to 5 mole percent based on the acid units of a branching component containing at least three ester forming groups. The branching component can be one that provides branching in the acid unit portion of the polyester, in the glycol unit portion, or it can be a hybrid branching agent that includes both acid and alcohol functionality. Illustrative of such branching components are tricarboxylic acids, such as trimesic acid, and lower alkyl esters thereof, and the like; tetracarboxylic acids, such as pyromellitic acid, and lower alkyl esters thereof, and the like; or preferably, polyols, and especially preferably, tetrols, such as pentaerythritol; triols, such as trimethylolpropane; dihydroxy carboxylic acids; and hydroxydicarboxylic acids and derivatives, such as dimethyl hydroxyterephthalate, and the like. Branched poly(alkylene terephthalate) resins and their preparation are described, for example, in U.S. Pat. No. 3,953,404 to Borman. In addition to terephthalic acid units, small amounts, e.g., from 0.5 to 15 mole percent of other aromatic dicarboxylic acids, such as isophthalic acid or naphthalene dicarboxylic acid, or aliphatic dicarboxylic acids, such as adipic acid, can also be present, as well as a minor amount of diol component other than that derived from 1,4-butanediol, such as ethylene glycol or cyclohexylenedimethanol, etc., as well as minor amounts of trifunctional, or higher, branching components, e.g., pentaerythritol, trimethyl trimesate, and the like.

The polyesters in one embodiment of the present invention, can be a polyether ester block copolymer consisting of a thermoplastic polyester as the hard segment and a polyalkylene glycol as the soft segment. It may also be a three-component copolymer obtained from at least one dicarboxylic acid selected from: aromatic dicarboxylic acids such as terephthalic acid, isophthalic acid, phthalic acid, naphthalene-2,6-dicarboxylic acid, naphthalene-2,7-dicarboxylic acid, diphenyl-4,4-dicarboxylic acid, diphenoxyethanedicarboxylic acid or 3-sulfoisophthalic acid, alicyclic dicarboxylic acids such as 1,4-cyclohexanedicarboxylic acid, aliphatic dicarboxylic acids such as succinic acid, oxalic acid, adipic acid, sebacic acid, dodecanedicarboxylic acid or dimeric acid, and ester-forming derivatives thereof, at least one diol selected from: aliphatic diols such as 1,4-butanediol, ethylene glycol, trimethylene glycol, tetramethylene glycol, pentamethylene glycol, hexamethylene glycol, neopentyl glycol or decamethylene glycol, alicyclic diols such as 1,1-cyclohexanedimethanol, 1,4-cyclohexanedimethanol or tricyclodecanedimethanol, and ester-forming derivatives thereof, and at least one poly(alkylene oxide) glycol selected from: polyethylene glycol or poly(1,2- and 1,3-propylene oxide) glycol with an average molecular weight of about 400-5000, ethylene oxide-propylene oxide copolymer, and ethylene oxide-tetrahydrofuran copolymer.

In one embodiment, the polyester has an intrinsic viscosity from about 0.3 to about 0.8 deciliters per gram (dl/g) (as measured in a 60:40, volume/volume ratio; solvent mixture of phenol/tetrachloroethane at 25° C.). In another embodiment, the polyesters can be branched or unbranched and having a weight average molecular weight of at least greater than 5000 gram per mole, preferably from about 15000 to about 150000 gram per mole against polystyrene standards as measured by gel permeation chromatography using 95:5 volume by volume ratio of chloroform and hexafluoroisopropanol mixture at 25° C. The polyester comprises different end groups. The end groups of the polyester are selected from the group consisting of acid end groups, hydroxyl end groups, vinyl end groups, ester end groups, alkyl end groups. In one embodiment, the polyester is at least about 60 weight percent of the total composition. In another embodiment, the polyester is present in a range from about 60 to about 99 weight percent of the polyester, based on the total weight percent of the polyester composition. In one embodiment of the present invention, the polyester has an acid value of at least 15.

Suitable fluoropolymers are capable of being fibrillated ("fibrillatable") during mixing, individually or collectively, with the polyester and the carboxy reactive compound and, optionally a filler. "Fibrillation" is a term of art that refers to the treatment of fluoropolymers so as to produce, for example, a "node and fibril," network, or cage-like structure. Suitable fluoropolymers include but are not limited to homopolymers and copolymers that comprise structural units derived from one or more fluorinated alpha-olefin monomers, that is, an alpha-olefin monomer that includes at least one fluorine atom in place of a hydrogen atom. In one embodiment, the fluoropolymer comprises structural units derived from two or more fluorinated alpha-olefin, for example tetrafluoroethylene, hexafluoroethylene, and the like. In another embodiment, the fluoropolymer comprises structural units derived from one or more fluorinated alpha-olefin monomers and one or more non-fluorinated monoethylenically unsaturated monomers that are copolymerizable with the fluorinated monomers. Examples of suitable fluorinated monomers include and are not limited to alpha-monoethylenically unsaturated copolymerizable monomers such as ethylene, propylene, butene, acrylate monomers (e.g., methyl methacrylate and butyl acrylate), vinyl ethers, (e.g., cyclohexyl vinyl ether, ethyl vinyl ether, n-butyl vinyl ether, vinyl esters) and the like. Specific examples of fluoropolymers include polytetrafluoroethylene, polyhexafluoropropylene, polyvinylidene fluoride, polychlorotrifluoroethylene, ethylene tetrafluoroethylene, fluorinated ethylene-propylene, polyvinyl fluoride, and ethylene chlorotrifluoroethylene. Combinations of the foregoing fluoropolymers can also be used.

Fluoropolymers are available in a variety of forms, including powders, emulsions, dispersions, agglomerations, and the like. "Dispersion" (also called "emulsion") fluoropolymers are generally manufactured by dispersion or emulsion, and generally comprise about 25 to 60 weight % fluoropolymer in water, stabilized with a surfactant, wherein the fluoropolymer particles are approximately 0.1 to 0.3 micrometers in diameter. "Fine powder" (or "coagulated dispersion") fluoropolymers can be made by coagulation and drying of dispersion-manufactured fluoropolymers. Fine powder fluoropolymers are generally manufactured to have a particle size of approximately 400 to 500 microns. "Granular" fluoropolymers can be made by a suspension method, and are generally manufactured in two different particle size ranges, including a median particle size of approximately 30 to 40 micrometers, and a high bulk density product exhibiting a median particle size of about 400 to 500 micrometers. Pellets of fluoropolymer may also be obtained and cryogenically ground to exhibit the desired particle size. In one embodiment, the fibrillation can be measured using microscopy techniques like scanning electron microscopy (SEM), tunneling electron microscopy (TEM) and the like. In another embodiment, the extent of fibrillation can be measured using calorimetric methods like the modulated differential scanning calorimetry (MDSC).

The MDSC method for determining extent of fibrillation of the fluoropolymer in the various compositions can be used to monitor the course and degree of fibrillation. MDSC involves for example, a Q1000 differential scanning calorimeter from TA Instruments can be used to conduct MDSC is conduct on approximately 1 to 5 mg of sample, and observations recorded around 320 to 360° C. (modulation range). A peak around 330° C. is observed, and can be deconvoluted into three different peaks, wherein the different peak temperatures correspond to different forms of fluoropolymer. A plot is then constructed using the raw data points from MDSC, and through baseline adjustment a clear magnified peak was observed (after subtraction). Deconvolution is made to fit Gauss Ian curves around 326° C. for melt crystallized PTFE, 330° C. for fibrillated PTFE, and 338° C. for native PTFE (nodal PTFE). The area under each curve is found to have a strong correlation with optimization of properties such as tensile modulus. In particular, a Node:Fibril ratio can be calculated based on the area under 338° C. peak (node) and 330° C. peak (fibril).

In one embodiment, the mixed fluoropolymer comprises fibrils having an average diameter of from about 5 nanometers to about 2 micrometers. The fluoropolymer may also have an average fibril diameter of from about 30 to about 750 nanometers, more specifically about 5 to about 500 nanometers. (Average diameters can be measured by scanning electron microscopy (SEM)). The ratio of the node fraction to fibril fraction (as reflected in the area under the curve in the MDSC determinations) of the mixed fluoropolymers can be less than about 2.5, specifically less than about 2, and even more specifically less than about 0.9.

In one embodiment, the fluoropolymer is at least partially encapsulated by an encapsulating polymer that can be the same or different as the matrix polymer (hereinafter referred to as an "encapsulated polymer"). Without being bound by theory, it is believed that encapsulation may aid in the distribution of the fluoropolymer within the matrix, and/or compatibilize the fluoropolymer with the matrix.

Suitable encapsulating polymers accordingly include, but are not limited to, vinyl polymers, acrylic polymers, polyacrylonitrile, polystyrenes, polyolefins, polyesters, polyurethanes, polyamides, polysulfones, polyimides, polyetherimides, polyphenylene ethers, polyphenylene sulfides, polyether ketones, polyether ether ketones, ABS resins, polyethersulfones, poly(alkenylaromatic) polymers, polybutadiene, liquid crystalline polymers, polyacetals, polycarbonates, polyphenylene ethers, ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, and combinations comprising at least one of the foregoing polymers.

The encapsulating polymers can be obtained by polymerization of monomers or mixtures of monomers by methods known in the art, for example, condensation, addition polymerization, and the like. Emulsion polymerization, particularly radical polymerization can be used effectively. In one embodiment, the encapsulating polymer is formed from monovinylaromatic monomers containing condensed aromatic ring structures, such as vinyl naphthalene, vinyl anthracene and the like. Examples of suitable monovinylaromatic monomers include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene can be specifically mentioned.

Other useful monomers for the formation of the encapsulating polymer include monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers such as for example include acrylonitrile, ethacrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers.

Mixtures of the foregoing monovinylaromatic monomers and monovinylic monomers may also be used, for example mixtures of styrene and acrylonitrile (SAN). The relative ratio of monovinylaromatic and monovinylic monomers in the rigid graft phase may vary widely depending on the type of fluoropolymer, type of monovinylaromatic and monovinylic monomer(s), and the desired properties of the encapsulant. The encapsulant may generally be formed from up to 100 wt. % of monovinyl aromatic monomer, specifically about 30 to about 100 wt. %, more specifically about 50 to about 90 wt. % monovinylaromatic monomer, with the balance being comonomer(s).

Elastomers may also be used as the encapsulating polymer, as well as elastomer-modified graft copolymers. Suitable elastomers include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers.

Suitable conjugated diene monomers that can be used are for example butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubbers may also be used, for example those produced by aqueous radical emulsion polymerization of a conjugated diene and up to 10 wt. % of one or more monomers copolymerizable therewith. Suitable copolymerizable monomers include the monovinylaromatic monomers and/or the monovinylic monomers. Specific copolymers include styrene and acrylonitrile.

(Meth)acrylate monomers suitable for use as an elastomeric encapsulating monomer include the cross-linked, particulate emulsion homopolymers or copolymers of $C_{4-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. Exemplary comonomers include but are not limited to butadiene, isoprene, styrene, methyl methacrylate, phenyl methacrylate, phenethylmethacrylate, N-cyclohexylacrylamide, vinyl methyl ether or acrylonitrile, and mixtures comprising at least one of the foregoing comonomomers. Optionally, up to 5 wt. % a polyfunctional crosslinking comonomer can be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth) acrylate, diallyl maleate, diallyl fumarate, diallyl adipate, triallyl esters of citric acid, triallyl esters of phosphoric acid, and the like, as well as combinations comprising at least one of the foregoing crosslinking agents.

Suitable elastomer-modified graft copolymers can be prepared by first providing an elastomeric polymer (for example, as described above), then polymerizing the constituent monomer(s) of the rigid phase in the presence of the fluoropolymer and the elastomer to obtain the graft copolymer. The elastomeric phase may provide about 5 to about 95 wt. % of the total graft copolymer, more specifically about 20 to about 90 wt. %, and even more specifically about 40 to about 85 wt. % of the elastomer-modified graft copolymer, the remainder being the rigid graft phase. Depending on the amount of elastomer-modified polymer present, a separate matrix or continuous phase of ungrafted rigid polymer or copolymer can be simultaneously obtained along with the elastomer-modified graft copolymer.

Specific encapsulating polymers include polystyrene, copolymers of polystyrene, poly(alpha-methylstyrene), poly (alpha-ethylstyrene), poly(alpha-propylstyrene), poly(alpha-butylstyrene), poly(p-methylstyrene), polyacrylonitrile, polymethacrylonitrile, poly(methyl acrylate), poly(ethyl acrylate), poly(propyl acrylate), and poly(butyl acrylate), poly(methyl methacrylate), poly(ethyl methacrylate), poly (propyl methacrylate), poly(butyl methacrylate); polybutadiene, copolymers of polybutadiene with propylene, poly(vinyl acetate), poly(vinyl chloride), poly(vinylidene chloride), poly(vinylidene fluoride), poly(vinyl alcohols), acrylonitrile-butadiene copolymer rubber, acrylonitrile-butadiene-styrene (ABS), poly($C_{4-8}$ alkyl acrylate) rubbers, styrene-butadiene rubbers (SBR), EPDM rubbers, silicon rubber and combinations comprising at least one of the foregoing encapsulating polymers.

In another embodiment, the encapsulating polymer comprises SAN, ABS copolymers, alpha-(C1-3)alkyl-styrene-acrylonitrile copolymers, alpha-methylstyrene-acrylonitrile (AMSAN) copolymers, SBR, and combinations comprising at least one of the foregoing. In yet another embodiment the encapsulating polymer is SAN or AMSAN.

Suitable amount of encapsulating polymer can be determined by one of ordinary skill in the art without undue experimentation, using the guidance provided below. In one embodiment, the encapsulated fluoropolymer comprises about 10 to about 90 weight percent (wt. %) fluoropolymer and about 90 to about 10 wt. % of the encapsulating polymer, based on the total weight of the encapsulated fluoropolymer. Alternatively, the encapsulated fluoropolymer comprises about 20 to about 80 wt. %, more specifically about 40 to about 60 wt. % fluoropolymer, and about 80 to about 20 wt. %, specifically about 60 about 40 wt. % encapsulating polymer, based on the total weight of the encapsulated polymer. In one embodiment of the present invention the fluoropolymer is present in an amount from about 0.5 to 15 weight percent, based on the total weight of the composition. Alternatively, the fluoropolymer is present in an amount from about 1 to 8 weight percent, based on the total weight of the composition.

In one embodiment, the polyester further comprises a carboxy reactive compound. The carboxy reactive compound functions as a viscosity modifier. Viscosity modifiers are defined as those compounds that enhance the viscosity of the polyesters. The carboxy reactive compound is a monofunctional or a polyfunctional carboxy-reactive material that can be either polymeric or non-polymeric. The functional group is selected from the group consisting of epoxy molecules, carbodiimides, orthoesters, aziridines, oxiranes, anhydrides, oxazolines, imidazolines, isocyanates and combinations thereof. The carboxy reactive compound is selected from the group consisting of mono epoxy silanes, mono, di or poly epoxy molecules, carbodiimides, orthoesters, anhydrides, oxazolines, imidazolines, isocyanates and combinations thereof. Non-limiting examples of reactive moieties include reactive silicon-containing materials, for example epoxy-modified silicone and silane monomers and polymers. If desired, a catalyst or co-catalyst system can be used to accelerate the reaction between the carboxy-reactive material and the polyester. As such, our embodiment includes compositions in which compositions further comprise a catalyst for the carboxy reactive compound.

The term "polyfunctional" or "multifunctional" in connection with the carboxy-reactive material means that at least two carboxy-reactive groups are present in each molecule of the material. Particularly useful polyfunctional carboxy-reactive materials include materials with at least two reactive epoxy groups. The polyfunctional epoxy material can contain aromatic and/or aliphatic residues. Examples include epoxy novolac resins, epoxidized vegetable (e.g., soybean, linseed) oils, tetraphenylethylene epoxide, styrene-acrylic copolymers containing pendant glycidyl groups, glycidyl methacrylate-containing polymers and copolymers, and difunctional epoxy compounds such as 3,4-epoxycyclohexylmethyl-3,4-epoxycyclohexanecarboxylate. In one embodiment, the polyfunctional carboxy reactive compound is an epoxy-functional polymer, which as used herein include oligomers. Exemplary polymers having multiple epoxy groups include the reaction products of one or more ethylenically unsaturated compounds (e.g., styrene, ethylene and the like) with an epoxy-containing ethylenically unsaturated monomer (e.g., a glycidyl $C_{1-4}$ (alkyl)acrylate, allyl glycidyl ethacrylate, and glycidyl itoconate).

The carboxy-reactive material is a monofunctional or a polyfunctional carboxy-reactive material that can be either polymeric or non-polymeric. The carboxy-reactive material can also include other functionalities that are either reactive or non-reactive under the described processing conditions. Non-limiting examples of reactive moieties include reactive silicon-containing materials, for example epoxy-modified silicone and silane monomers and polymers. If desired, a catalyst or co-catalyst system can be used to accelerate the reaction between the carboxy-reactive material and the polyester. Other functionalities which will not interfere with an epoxidizing action of the epoxidizing agent may also be present in the molecule, for example, esters, ethers, hydroxy, ketones, halogens, aromatic rings, etc.

For example, in one embodiment, the polyfunctional carboxy-reactive material is a styrene-acrylic copolymer (including an oligomer) containing glycidyl groups incorporated as side chains. Several useful examples are described in the International Patent Application WO 03/066704 A1, assigned to Johnson Polymer, LLC, which is incorporated herein by reference in its entirety. In one embodiment, the epoxy polymer is an epoxy functional (alkyl)acrylic monomer and at least one non-functional styrenic and/or (alkyl) acrylic monomer. Non-limiting examples of epoxy-functional (meth)acrylic monomers include both acrylates and methacrylates. Examples of these monomers include, but are not limited to, those containing 1,2-epoxy groups such as glycidyl acrylate and glycidyl methacrylate. Other suitable epoxy-functional monomers include allyl glycidyl ether, glycidyl ethacrylate, and glycidyl itaconate. These materials are based on copolymers with styrene and acrylate building blocks that have glycidyl groups incorporated as side chains. A high number of epoxy groups per polymer chain is desired, at least about 10, for example, or greater than about 15, or greater than about 20. These polymeric materials generally have a molecular weight greater than about 3000, preferably greater than about 4000, and more preferably greater than about 6000. These are commercially available from Johnson Polymer, LLC under the Joncryl® trade name, preferably the Joncryl® ADR 4368 material.

Another example of a carboxy reactive copolymer is the reaction product of an epoxy-functional $C_{14}$(alkyl)acrylic monomer with a non-functional styrenic and/or $C_{1-4}$(alkyl) acrylate and/or olefin monomer. In one embodiment, the epoxy polymer is the reaction product of an epoxy-functional (meth)acrylic monomer and a non-functional styrenic and/or (meth)acrylate monomer. These carboxy reactive compounds are characterized by relatively low molecular weights. In another embodiment, the carboxy reactive compound is an epoxy-functional styrene (meth)acrylic copolymer produced from an epoxy functional (meth)acrylic monomer and styrene. Examples of specific epoxy-functional (meth)acrylic monomers include, but are not limited to, those containing 1,2-epoxy groups such as glycidyl acrylate and glycidyl methacrylate.

Suitable $C_{1-4}$(alkyl)acrylate comonomers include, but are not limited to, acrylate and methacrylate monomers such as methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Combinations comprising at least one of the foregoing comonomers can be used.

Suitable styrenic monomers include, but are not limited to, styrene, alpha-methyl styrene, vinyl toluene, p-methyl styrene, t-butyl styrene, o-chlorostyrene, and mixtures comprising at least one of the foregoing. In certain embodiments, the styrenic monomer is styrene and/or alpha-methyl styrene.

Epoxy functional materials suitable for use as the carboxyl reactive group contain aliphatic or cycloaliphatic epoxy or polyepoxy functionalization. Generally, epoxy functional materials suitable for use herein are derived by the reaction of an epoxidizing agent, such as peracetic acid, and an aliphatic or cycloaliphatic point of unsaturation in a molecule.

In another embodiment, the carboxy reactive compound is an epoxy compound having two terminal epoxy functionalities, and optionally additional epoxy (or other) functionalities. The compound can further contain only carbon, hydrogen, and oxygen. Difunctional epoxy compounds, in particular those containing only carbon, hydrogen, and oxygen can have a molecular weight of below about 1000 g/mol, to facilitate blending with the polyester resin. In one embodiment, the difunctional epoxy compounds have at least one of the epoxide groups on a cyclohexane ring. Exemplary difunctional epoxy compounds include, but are not limited to, 3,4-epoxycyclohexyl-3,4-epoxycyclohexyl carboxylate, bis(3,4-epoxycyclohexylmethyl) adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl) adipate, butadiene diepoxide, vinylcyclohexene diepoxide, dicyclopentadiene diepoxide, and the like. Especially preferred is 3,4-epoxycyclohexyl-3,4 epoxycyclohexylcarboxylate.

The difunctional epoxide compounds can be made by techniques well known to those skilled in the art. For example, the corresponding α- or β-dihydroxy compounds can be dehydrated to produce the epoxide groups, or the corresponding unsaturated compounds can be epoxidized by treatment with a peracid, such as peracetic acid, in well-known techniques. The compounds are also commercially available.

Other preferred materials with multiple epoxy groups are acrylic and/or polyolefin copolymers and oligomers containing glycidyl groups incorporated as side chains.

Suitable epoxy-functional materials are available from Dow Chemical Company under the tradename D.E.R.332, D.E.R.661, and D.E.R.667; from Resolution Performance Products under the trade name EPON Resin 1001F, 1004F, 1005F, 1007F, and 1009F; from Shell Oil Corporation under the tradenames Epon 826, 828, and 871; from Ciba-Giegy Corporation under the tradenames CY-182 and CY-183; and from Dow Chemical Co. under the tradename ERL-4221 and ERL-4299. As set forth in the Examples, Johnson Polymer Co is a supplier of an epoxy functionalized material known as ADR4368 and 4300. A further example of a polyfunctional carboxy-reactive material is a co- or terpolymer including units of ethylene and glycidyl methacrylate (GMA), sold by Arkema under the trade name LOTADER®.

In still another embodiment, the carboxy-reactive material is a multifunctional material having two or more reactive groups, wherein at least one of the groups is an epoxy group and at least one of the groups is a group reactive with the polyester, but is not an epoxy group. The second reactive group can be a hydroxyl, an isocyanate, a silane, and the like.

Examples of such multifunctional carboxy-reactive materials include materials with a combination of epoxy and silane functional groups, preferably terminal epoxy and silane groups. The epoxy silane is generally any kind of epoxy silane wherein the epoxy is at one end of the molecule and attached to a cycloaliphatic group and the silane is at the other end of the molecule. The epoxy silane which is contacted with and reacts with the polyester is generally any kind of epoxy silane wherein the epoxy is at one end of the molecule and attached to a cycloaliphatic group and the silane is at the other end of the molecule. A desired epoxy silane within that general description is of formula (II).

$$X_{3-n}Me_nSi-R^3-Y \qquad (II)$$

wherein X is a hydrolysable group selected from the group consisting of acetate, isocyanate, alkoxide, ether and combinations thereof, Y is an organic reactive molecule selected from the group consisting of epoxide, methacrylate, mercaptan, polysulfide, amines, alkyl, isocyanate, carbamate, urea, vinyl, and combinations thereof, and n is an integer from 1 to 3. In one embodiment the carboxy reactive compound can be Glycidoxy trialkoxy silane.

Such materials include, for example, β-(3,4-epoxycyclohexyl)ethyltriethoxysilane, available under the trade name CoatOSil 1770 from GE. Other examples are β-(3,4-epoxycyclohexyl)ethyltrimethoxysilane, available under the trade name Silquest A-186 from GE, and 3-glycidoxypropyltriethoxysilane, available under the trade name Silquest Y-15589 from GE.

According to an embodiment, the carboxy reactive compound may include reactive oxazoline compounds, which are also known as cyclic imino ether compounds. Such compounds are described in Van Benthem, Rudolfus A. T. et al., U.S. Pat. No. 6,660,869 or in Nakata, Yoshitomo et al., U.S. Pat. No. 6,100,366. Examples of such compounds are phenylene bisoxazolines (hereinafter also called "PBO"), 1,3-PBO, 1,4-PBO, 1,2-naphthalene bisoxazoline, 1,8-naphthalene bisoxazoline, 1,11-dimethyl-1,3-PBO and 1,11-dimethyl-1,4-PBO.

In another embodiment, the carboxy reactive compound can be oligomeric copolymer of vinyl oxazoline and acrylic monomers. Specific examples of preferable oxazoline monomers include 2-vinyl-2-oxazoline, 5-methyl-2-vinyl-2-oxazoline, 4,4-dimethyl-2-vinyl-2-oxazoline, 4,4-dimethyl-2-vinyl-5,5-dihydro-4H-1,3-oxazoline, 2-isopropenyl-2-oxazoline, and 4,4-dimethyl-2-isopropenyl-2-oxazoline. Particularly, 2-isopropenyl-2-oxazoline and 4,4-dimethyl-2-isopropenyl-2-oxazoline are preferable, because they show good copolymerizability. The monomer component may further include other monomers copolymerizable with the cyclic imino ether group containing monomer. Examples of such other monomers include unsaturated alkyl carboxylate monomers, aromatic vinyl monomers, and vinyl cyamide monomers. These other monomers can be used either alone respectively or in combinations with each other. Examples of the unsaturated alkyl carboxylate monomer include methyl (meth)acrylate, ethyl (meth)acrylate, propyl (meth)acrylate, n-butyl (meth)acrylate, iso-butyl (meth)acrylate, t-butyl (meth)acrylate, 2-ethylhexyl (meth)acrylate, n-octyl (meth) acrylate, iso-nonyl (meth)acrylate, dodecyl (meth)acrylate, and stearyl (meth)acrylate, styrene and α-methyl styrene.

In one embodiment, the carboxy reactive compound comprises bisoxazolines for the formula (III)

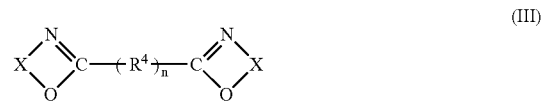

wherein X is a bivalent group, and wherein X gives a 5-membered ring or 6-membered ring and $R^4$ is at least one bivalent group selected from aliphatic, aromatic or cycloaliphatic groups, and n is an integer from 0 to 5. In one embodiment X is at least one selected from the group consisting of a substituted or unsubstituted ethylene group, or substituted or unsubstituted trimethylene group. The substitution on the ethylene or trimethylene group is selected from the group consisting of methyl, ethyl, hexyl, alkylhexyl, nonyl, phenyl, naphthyl, diphenyl, or cyclohexyl groups. In one embodiment, the bisoxazolines is at least one selected from the group consisting of 2,2'-bis(2-oxazoline), 2,2'-bis(4-methyl-2-oxazoline), 2,2'-bis(4-phenyl-2-oxazoline), 2,2'-bis(4-hexyloxazoline), 2,2'-p-phenylenebis(2-oxazoline), 2,2'-m-phenylenebis(2-oxazoline), 2,2'-tetramethylenebis(4,4'-dimethyl-2-oxazoline). In one embodiment, carboxy reactive compound is selected from the group consisting of epoxy and orthoester. In one embodiment carboxy reactive compound is of the formula (IV)

wherein $R^5$, $R^6$, $R^7$ are independently at any occurrence an alkyl, alkoxy, aromatic, aryloxy, hydroxy, or hydrogen, alkoxy or aryloxy or hydroxy. In yet another embodiment carboxy reactive compound is of the formula (V)

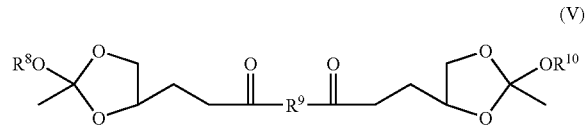

wherein $R^8$, $R^{10}$ are independently at each occurrence selected from the group consisting of alkyl, aromatic, hydrogen and $R^9$ is an aromatic radical.

According to an embodiment, such additional carboxyl reactive groups may include reactive imidazoline compounds. These imidazoline compounds are preferably 2-imidazolines as described in the references, Synthesis, Vol 12, Page 963 to 965, 1981 and Chemical Review, 54, 593-613 (1954). Typically, the imidazoline compound comprises at least one imidazoline group and not restricted 1,3-phenylene-bisimidazoline, or 1,4-phenylene-bisimidazoline. A typical process to prepare 1,4-phenylene-bisimidazoline includes the condensation of p-benzodinitrile with ethylene diamine.

In one embodiment, the carboxy reactive compound component can have impact modifying properties. An example of such a carboxy reactive compound having impact modifying properties is a co- or ter-polymer including units of ethylene and glycidyl methacrylate (GMA), sold by Arkema. Typical composition of such glycidyl ester impact modifier is about 67 wt % ethylene, 25 wt % methyl methacrylate and 8 wt % glycidyl methacrylate impact modifier, available from Atofina under the brand name LOTADER 8900). Another example of a carboxy reactive component that has impact modifying properties is a terpolymer made of ethylene, butyl acrylate and glycidyl methacrylate (e.g., the ELVALOY PT or PTW series from Dupont). In one embodiment the composition comprises mono or di epoxy compounds that do not act as a viscosity modifier.

The type and amount of the carboxy reactive compound will depend on the desired characteristics of the composition, the type of polyester used, the type and amount of other additives present in the composition and like considerations. The carboxy reactive compound is added to the polyester compositions in amounts effective to improve visual and/or measured physical properties. A person skilled in the art may determine the optimum type and amount of any given carboxy reactive compound without undue experimentation, using the guidelines provided herein.

Typically, the carboxy reactive compound is present in an amount of less than 5 weight percent. In one embodiment the carboxy reactive compound is present in a range from about 0.05 weight percent and about 5 weight percent based on the total weight of the composition. In another embodiment the carboxy reactive compound is present in a range of from about 0.2 weight percent and about 5 weight percent based on the total weight of the composition. In one embodiment the ratio of the functional group of the carboxy reactive compound to the carboxylic group of the polyester is in the range from about 0.5 to about 1.5.

The polymer composition may further contain a filler, including the fillers and solid compounding ingredients or agents commonly used in polymeric compositions. The filler is added in an amount such that the balance combination of the mechanical properties is not affected. The filler can be selected from the group consisting of calcium carbonate, mica, kaolin, talc, glass fibers, carbon fibers, carbon nanotubes, magnesium carbonate, sulfates of barium, calcium sulfate, titanium, nano clay, carbon black, silica, hydroxides of aluminum or ammonium or magnesium, zirconia, nanoscale titania, or a combination thereof.

One useful class of fillers is the particulate fillers, which can be of any configuration, for example spheres, plates, fibers, acicular, flakes, whiskers, or irregular shapes. Suitable fillers typically have an average longest dimension of about 1 nanometer to about 500 micrometers, specifically about 10 nanometers to about 100 micrometers. The average aspect ratio (length:diameter) of some fibrous, acicular, or whisker-shaped fillers (e.g., glass or wollastonite) can be about 1.5 to about 1000, although longer fibers are also within the scope of the invention. The mean aspect ratio (mean diameter of a circle of the same area: mean thickness) of plate-like fillers (e.g., mica, talc, or kaolin) can be greater than about 5, specifically about 10 to about 1000, more specifically about 10 to about 200. Bimodal, trimodal, or higher mixtures of aspect ratios may also be used.

The fillers can be of natural or synthetic, mineral or non-mineral origin, provided that the fillers have sufficient thermal resistance to maintain their solid physical structure at least at the processing temperature of the composition with which it is combined. Suitable fillers include clays, nanoclays, carbon black, wood flour either with or without oil, various forms of silica (precipitated or hydrated, fumed or pyrogenic, vitreous, fused or colloidal, including common sand), glass, metals, inorganic oxides (such as oxides of the metals in Periods 2, 3, 4, 5 and 6 of Groups Ib, IIb, IIIa, IIIb, IVa, IVb (except carbon), Va, VIa, VIa and VIII of the Periodic Table), oxides of metals (such as aluminum oxide, titanium oxide, zirconium oxide, titanium dioxide, nanoscale titanium oxide, aluminum trihydrate, vanadium oxide, and magnesium oxide), hydroxides of aluminum or ammonium or magnesium, carbonates of alkali and alkaline earth metals (such as calcium carbonate, barium carbonate, and magnesium carbonate), antimony trioxide, calcium silicate, diatomaceous earth, fuller earth, kieselguhr, mica, talc, slate flour, volcanic ash, cotton flock, asbestos, kaolin, alkali and alkaline earth metal sulfates (such as sulfates of barium and calcium sulfate), titanium, zeolites, wollastonite, titanium boride, zinc borate, tungsten carbide, ferrites, molybdenum disulfide, asbestos, cristobalite, aluminosilicates including Vermiculite, Bentonite, montmorillonite, Na-montmorillonite, Ca-montmorillonite, hydrated sodium calcium aluminum magnesium silicate hydroxide, pyrophyllite, magnesium aluminum silicates, lithium aluminum silicates, zirconium silicates, and combinations comprising at least one of the foregoing fillers. Suitable fibrous fillers include glass fibers, basalt fibers, aramid fibers, carbon fibers, carbon nanofibers, carbon nanotubes, carbon buckyballs, ultra high molecular weight polyethylene fibers, melamine fibers, polyamide fibers, cellulose fiber, metal fibers, potassium titanate whiskers, and aluminum borate whiskers.

Of these, calcium carbonate, talc, glass fibers, carbon fibers, magnesium carbonate, mica, silicon carbide, kaolin, wollastonite, calcium sulfate, barium sulfate, titanium, silica, carbon black, ammonium hydroxide, magnesium hydroxide, aluminum hydroxide, and combinations comprising at least one of the foregoing are useful. It has been found that mica, talc, silicon carbide, and combinations comprising at least one of the foregoing fillers are of specific utility.

Alternatively, or in addition to a particulate filler, the filler can be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

Optionally, the fillers can be surface modified, for example treated so as to improve the compatibility of the filler and the polymeric portions of the compositions, which facilitates deagglomeration and the uniform distribution of fillers into the polymers. One suitable surface modification is the durable attachment of a coupling agent that subsequently bonds to the polymers. Use of suitable coupling agents may also improve impact, tensile, flexural, and/or dielectric properties in plastics and elastomers; film integrity, substrate adhesion, weathering and service life in coatings; and application and tooling properties, substrate adhesion, cohesive strength, and service life in adhesives and sealants. Suitable coupling agents include silanes, titanates, zirconates, zircoaluminates, carboxylated polyolefins, chromates, chlorinated paraffins, organosilicon compounds, and reactive cellulosics. The fillers may also be partially or entirely coated with a layer of metallic material to facilitate conductivity, e.g., gold, copper, silver, and the like.

In a preferred embodiment, the reinforcing filler comprises glass fibers. For compositions ultimately employed for electrical uses, it is preferred to use fibrous glass fibers comprising lime-aluminum borosilicate glass that is relatively soda free, commonly known as "E" glass. However, other glasses are useful where electrical properties are not so important, e.g., the low soda glass commonly known as "C" glass. The glass fibers can be made by standard processes, such as by steam or air blowing, flame blowing and mechanical pulling. Preferred glass fibers for plastic reinforcement can be made by mechanical pulling. The diameter of the glass fibers is generally about 1 to about 50 micrometers, preferably about 1 to about 20 micrometers. Smaller diameter fibers are generally more expensive, and glass fibers having diameters of about 10 to about 20 micrometers presently offer a desirable balance of cost and performance. The glass fibers can be bundled into fibers and the fibers bundled in turn to yarns, ropes or rovings, or woven into mats, and the like, as is required by the particular end use of the composition. In preparing the molding compositions, it is convenient to use the filamentous glass in the form of chopped strands of about one-eighth to about 2 inches long, which usually results in filament lengths between about 0.0005 to about 0.25 inch in the molded compounds. Such glass fibers are normally supplied by the manufacturers with a surface treatment compatible with the polymer component of the composition, such as a siloxane, titanate, or polyurethane sizing, or the like.

When present in the composition, the filler can be used from 0 to about 35 weight percent, based on the total weight of the composition. Within this range, it is preferred to use at least about 25 weight percent of the reinforcing filler. Also within this range, it is preferred to use up to about 10 weight percent of the filler.

In one embodiment, an unreactive impact modifier can be added to the composition to increase its impact resistance. The unreactive impact modifier is one that would not react with the polyester. Thus, the impact modifiers can be present in amounts of 0 to 25 weight percent (wt. %) based on the total weight of the composition, specifically about 5 to about 20 wt. % based on the total weight of the composition.

The composition can further comprise an impact modifier. Impact modifiers, as used herein, include materials effective to improve the impact properties of polyesters.

Useful impact modifiers are substantially amorphous copolymer resins, including but not limited to acrylic rubbers, ASA rubbers, diene rubbers, organosiloxane rubbers, EPDM rubbers, SBS or SEBS rubbers, ABS rubbers, MBS rubbers and glycidyl ester impact modifiers The acrylic rubber is preferably core-shell polymers built up from a rubber-like core on which one or more shells have been grafted. Typical core material consists substantially of an acrylate rubber. Preferable the core is an acrylate rubber of derived from a C4 to C12 acrylate. Typically, one or more shells are grafted on the core. Usually these shells are built up for the greater part from a vinyl aromatic compound and/or a vinyl cyamide and/or an alkyl(meth)acrylate and/or (meth) acrylic acid. Preferable the shell is derived from an alkyl (meth)acrylate, more preferable a methyl(meth)acrylate. The core and/or the shell(s) often comprise multi-functional compounds that may act as a cross-linking agent and/or as a grafting agent. These polymers are usually prepared in several stages. The preparation of core-shell polymers and their use as impact modifiers are described in U.S. Pat. Nos. 3,864, 428 and 4,264,487. Especially preferred grafted polymers are the core-shell polymers available from Rohm & Haas under the trade name PARALOID®, including, for example, PARALOID® EXL3691 and PARALOID® EXL3330, EXL3300 and EXL2300. Core shell acrylic rubbers can be of various particle sizes. The preferred range is from 300-800 nm, however larger particles, or mixtures of small and large particles, may also be used. In some instances, especially where good appearance is required acrylic rubber with a particle size of 350-450 nm may be preferred. In other applications where higher impact is desired acrylic rubber particle sizes of 450-550 nm or 650-750 nm may be employed.

Acrylic impact modifiers contribute to heat stability and UV resistance as well as impact strength of polymer compositions. Other preferred rubbers useful herein as impact modifiers include graft and/or core shell structures having a rubbery component with a Tg (glass transition temperature) below 0° C., preferably between about −40° to about −80° C., which comprise poly-alkylacrylates or polyolefins grafted with poly(methyl)methacrylate or styrene-acrylonitrile copolymer. Preferably the rubber content is at least about 10% by weight, most preferably, at least about 50%.

Typical other rubbers for use as impact modifiers herein are the butadiene core-shell polymers of the type available from Rohm & Haas under the trade name PARALOID® EXL2600. Most preferably, the impact modifier will comprise a two stage polymer having a butadiene based rubbery core, and a second stage polymerized from methylmethacrylate alone or in combination with styrene. Impact modifiers of the type also include those that comprise acrylonitrile and styrene grafted onto cross-linked butadiene polymer, which are disclosed in U.S. Pat. No. 4,292,233 herein incorporated by reference.

Other suitable impact modifiers may be mixtures comprising core shell impact modifiers made via emulsion polymerization using alkyl acrylate, styrene and butadiene. These include, for example, methylmethacrylate-butadiene-styrene (MBS) and methylmethacrylate-butylacrylate core shell rubbers.

Among the other suitable impact modifiers are the so-called block copolymers and rubbery impact modifiers, for example, A-B-A triblock copolymers and A-B diblock copolymers. The A-B and A-B-A type block copolymer rubber additives which may be used as impact modifiers include thermoplastic rubbers comprised of one or two alkenyl aromatic blocks which are typically styrene blocks and a rubber block, e.g., a butadiene block which may be partially hydrogenated. Mixtures of these triblock copolymers and diblock copolymers are especially useful.

Suitable A-B and A-B-A type block copolymers are disclosed in, for example, U.S. Pat. Nos. 3,078,254, 3,402,159, 3,297,793, 3,265,765, and 3,594,452 and U.K. Patent 1,264, 741. Examples of typical species of A-B and A-B-A block copolymers include polystyrene-polybutadiene (SB), polystyrene-poly(ethylene-propylene), polystyrene-polyisoprene, poly(α-methylstyrene)-polybutadiene, polystyrene-polybutadiene-polystyrene (SBS), polystyrene-poly (ethylene-propylene)-polystyrene, polystyrene-polyisoprene-polystyrene and poly(α-methylstyrene)-polybutadiene-poly(α-methylstyrene), as well as the selectively hydrogenated versions thereof, and the like. Mixtures comprising at least one of the aforementioned block copolymers are also useful. Such A-B and A-B-A block copolymers are available commercially from a number of sources, including Phillips Petroleum under the trademark SOLPRENE, Shell Chemical Co., under the trademark KRATON, Dexco under the trade name VECTOR®, and Kuraray under the trademark SEPTON.

The composition can also comprise a vinyl aromatic-vinyl cyamide copolymer. Suitable vinyl cyamide compounds include acrylonitrile and substituted vinyl cyamides such a methacrylonitrile. Preferably, the impact modifier comprises styrene-acrylonitrile copolymer (hereinafter SAN). The preferred SAN composition comprises at least 10, preferably 25 to 28, percent by weight acrylonitrile (AN) with the remainder styrene, para-methyl styrene, or alpha methyl styrene. Another example of SANs useful herein include those modified by grafting SAN to a rubbery substrate such as, for example, 1,4-polybutadiene, to produce a rubber graft polymeric impact modifier. High rubber content (greater than 50% by weight) resin of this type (HRG-ABS) may be especially useful for impact modification of polyester resins and their polycarbonate blends.

Another class of preferred impact modifiers, referred to as high rubber graft ABS modifiers, comprise greater than or equal to about 90% by weight SAN grafted onto polybutadiene, the remainder being free SAN. ABS can have butadiene contents between 12% and 85% by weight and styrene to acrylonitrile ratios between 90:10 and 60:40. Preferred compositions include: about 8% acrylonitrile, 43% butadiene and 49% styrene, and about 7% acrylonitrile, 50% butadiene and 43% styrene, by weight. These materials are commercially available under the trade names BLENDEX 336 and BLENDEX 415 respectively (Crompton Co.).

Improved impact strength is obtained by melt compounding polybutylene terephthalate with ethylene homo- and copolymers functionalized with either acid or ester moieties as taught in U.S. Pat. Nos. 3,405,198; 3,769,260; 4,327,764; and 4,364,280. Polyblends of polybutylene terephthalate with a styrene-alpha-olefin-styrene triblock are taught in U.S. Pat. No. 4,119,607; U.S. Pat. No. 4,172,859 teaches impact modification of polybutylene terephthalate with random ethylene-acrylate copolymers and EPDM rubbers grafted with a monomeric ester or acid functionality. Preferred impact modifiers include core-shell impact modifiers, such as those having a core of poly(butyl acrylate) and a shell of poly(methyl methacrylate).

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

In one embodiment, the polyester composition may further comprise an thermoplastic resin with an intrinsic viscosity of greater than at least 0.8 deciliters per gram (dl/g) (as measured in 60:40 volume by volume solvent mixture of phenol/tetrachloroethane at 25° C.). In one embodiment, the thermoplastic resin with an intrinsic viscosity of greater than at least 0.7 deciliters per gram can be selected from the group consisting of vinyl polymers, acrylic polymers, polyacrylonitrile, polystyrenes, polyolefins, polyesters, polyurethanes, polyamides, polysulfones, polyimides, polyetherimides, polyphenylene ethers, polyphenylene sulfides, polyether ketones, polyether ether ketones, ABS resins, polyethersulfones, poly(alkenylaromatic) polymers, polybutadiene, liquid crystalline polymers, polyacetals, polycarbonates, polyphenylene ethers, ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, and combinations comprising at least one of the foregoing polymers. In one embodiment, the thermoplastic resin with an intrinsic viscosity of greater than at least 0.8 deciliters per gram is present in an amount from 0 to about 40 weight percent based on the total weight of the composition. In another embodiment thermoplastic resin with an intrinsic viscosity of greater than at least 0.8 deciliters per gram is present in an amount from about 5 to about 25 weight percent based on the total weight of the composition.

Optionally, the polymer composition may further contain one or more additives ordinarily incorporated in resin compositions of this type, preferably with the proviso that the additive(s)s are selected so as to not significantly adversely affect the desired properties of the thermoplastic composition but enhance other favorable properties. Mixtures of additives can be used. Such additives can be mixed at a suitable time during the mixing of the components for forming the composition. Exemplary additives include extenders, lubricants, flow modifiers, fire retardants, pigments, dyes, colorants, UV stabilizers, antioxidants, impact modifiers, plasticizers, mold release agents, nucleating agents, optical brighteners, flame proofing agents, anti-static agents, blowing agents, and the like. The additive is present ranging from 0 to 40 weight percent, based on the total weight of composition.

Flame-retardant additives are desirably present in an amount at least sufficient to reduce the flammability of the polyester resin, preferably to a UL94 V-0 rating. The amount will vary with the nature of the resin and with the efficiency of the additive. In general, however, the amount of additive will be from 0 to 30 percent by weight based on the weight of resin. A preferred range will be from about 5 to 20 percent.

Typically, halogenated aromatic flame-retardants include tetrabromobisphenol a polycarbonate oligomer, polybromophenyl ether, brominated polystyrene, brominated BPA polyepoxide, brominated imides, brominated polycarbonate, poly (haloaryl acrylate), poly (haloaryl methacrylate), or mixtures thereof. Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins.

Alternatively, the thermoplastic composition can be essentially free of chlorine and bromine. Essentially free of chlorine and bromine as used herein refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine can be defined as having a bromine and/or chlorine content of less than about 100 parts per million by weight (ppm), less than about 75 ppm, or less than about 50 ppm. When this definition is applied to the fire retardant it is based on the total weight of the fire retardant. When this definition is applied to the thermoplastic composition it is based on the total weight of the polymer portion of the composition and fire retardant.

Neutralizing additives can be for example, melamine, polyvinylpyrrolidone, dicyandiamide, triallyl cyanurate, urea derivatives, hydrazine derivatives, amines, polyamides, and polyurethanes; alkali metal salts and alkaline earth metal salts of higher fatty acids, such as for example, calcium stearate, calcium stearoyl lactate, calcium lactate, zinc stearate, magnesium stearate, sodium ricinoleate, and potassium palmitate; antimony pyrocatecholate, zinc pyrocatecholate, and hydrotalcites and synthetic hydrotalcites. Hydroxy carbonates, magnesium zinc hydroxycarbonates, magnesium aluminum hydroxycarbonates, and aluminum zinc hydroxycarbonates; as well as metal oxides, such as zinc oxide, magnesium oxide and calcium oxide; peroxide scavengers, such as, e.g., (C10-C20) alkyl esters of beta-thiodipropionic acid, such as for example the lauryl, stearyl, myristyl or tridecyl esters; mercapto benzimidazole or the zinc salt of 2-mercaptobenzimidazole, zinc-dibutyldithiocarbamate, dioctadecyldisulfide, and pentaerythritol tetrakis(.beta.-dodecylmercapto) propionate may also be used. When present, the neutralizers can be used in amounts of about 0.01 to about 5 parts, or from 5 to about 50 parts by weight, more specifically about 10 to about 40 parts by weight, based on 100 parts by weight of the polymer portion of the composition.

In yet another embodiment, the optional additive is a polyamide stabilizer, such as, copper salts in combination with iodides and/or phosphorus compounds and salts of divalent manganese. Examples of sterically hindered amines include but are not restricted to triisopropanol amine or the reaction product of 2,4-dichloro-6-(4-morpholinyl)-1,3,5-triazine with a polymer of 1,6-diamine, N,N'-Bis(-2,2,4,6-tetramethyl-4-piperidinyl) hexane.

The flame retardants are typically used with a synergist, particularly inorganic antimony compounds. Such compounds are widely available or can be made in known ways. Typical, inorganic synergist compounds include $Sb_2O_3_5$, $Sb2S_3$, sodium antimonate and the like. Especially preferred is antimony trioxide ($Sb_2O_3$). Synergists such as antimony oxides, are typically used at about 0.1 to 10 by weight based on the weight percent of resin in the final composition. Also, the final composition may contain polytetrafluoroethylene (PTFE) type resins or copolymers used to reduce dripping in flame retardant thermoplastics. Also, other halogen-free flame retardants than the mentioned P or N containing compounds can be used, non limiting examples being compounds as Zn-borates, hydroxides or carbonates as Mg- and/or Al-hydroxides or carbonates, Si-based compounds like silanes or siloxanes, Sulfur based compounds as aryl sulphonates (including salts of it) or sulphoxides, Sn-compounds as stannates can be used as well often in combination with one or more of the other possible flame retardants.

Other additional ingredients may include antioxidants, and UV absorbers, and other stabilizers. Antioxidants include i) alkylated monophenols, for example: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(alpha-methylcyclohexyl)-4,6 dimethylphenol, 2,6-di-octadecyl-4-methylphenol, 2,4,6,-tricyclohexyphenol, 2,6-di-tert-butyl-4-methoxymethylphenol; ii) alkylated hydroquinones, for example, 2,6-di-tert-butyl-4-methoxyphenol, 2,5-di-tert-butyl-hydroquinone, 2,5-di-tert-amyl-hydroquinone, 2,6-diphenyl-4-octadecyloxyphenol; iii) hydroxylated thiodiphenyl ethers; iv) alkylidene-bisphenols; v) benzyl compounds, for example, 1,3,5-tris-(3,5-di-tert-butyl-4-hydroxybenzyl)-2,4,6-trimethylbenzene; yl) acylaminophenols, for example, 4-hydroxy-lauric acid anilide; vii) esters of beta-(3,5-di-tert-butyl-4-hydroxyphenol)-propionic acid with monohydric or polyhydric alcohols; viii) esters of beta-(5-tert-butyl-4-hydroxy-3-methylphenyl)-propionic acid with monohydric or polyhydric alcohols; vii) esters of beta-(5-tert-butyl-4-hydroxy-3-methylphenyl) propionic acid with mono- or polyhydric alcohols, e.g., with methanol, diethylene glycol, octadecanol, triethylene glycol, 1,6-hexanediol, pentaerythritol, neopentyl glycol, tris(hydroxyethyl) isocyanurate, thiodiethylene glycol, N,N-bis(hydroxyethyl) oxalic acid diamide. Typical, UV absorbers and light stabilizers include i) 2-(2'-hydroxyphenyl)-benzotriazoles, for example, the 5'methyl-, 3'5'-di-tert-butyl-,5'-tert-butyl-,5 '(1,1,3,3-tetramethylbutyl)-,5-chloro-3',5'-di-tert-butyl-,5-chloro-3'tert-butyl-5 'methyl-,3'sec-butyl-5 'tert-butyl-,4'-octoxy,3',5'-ditert-amyl-3',5'-bis-(alpha, alpha-dimethylbenzyl)-derivatives; ii) 2.2 2-Hydroxy-benzophenones, for example, the 4-hydroxy-4-methoxy-,4-octoxy,4-decloxy-,4-dodecyloxy-,4-benzyloxy, 4,2',4'-trihydroxy- and 2'hydroxy-4,4'-dimethoxy derivative, and iii) esters of substituted and unsubstituted benzoic acids for example, phenyl salicylate, 4-tert-butylphenyl-salicilate, octylphenyl salicylate, dibenzoylresorcinol, bis(4-tert-butylbenzoyl)-resorcinol, benzoylresorcinol, 2,4-di-tert-butylphenyl-3,5-di-tert-butyl-4-hydroxybenzoate and hexadecyl-3,5-di-tert-butyl-4-hydroxybenzoate.

The composition can further comprise one or more anti-dripping agents, which prevent or retard the resin from dripping while the resin is subjected to burning conditions. Specific examples of such agents include silicone oils, silica (which also serves as a reinforcing filler), asbestos, and the like.

Plasticizers, lubricants, and/or mold release agents additives may also be used. There is considerable overlap among these types of materials, which include, for example, phthalic acid esters, tris-(octoxycarbonylethyl)isocyanurate, tristearin, di- or polyfunctional aromatic phosphates such as resorcinol tetraphenyl diphosphate (RDP), the bis(diphenyl) phosphate of hydroquinone and the bis(diphenyl) phosphate of bisphenol-A, poly-alpha-olefins, epoxidized soybean oil, silicones, including silicone oils; sodium, calcium or magnesium salts of fatty acids such as lauric acid, palmitic acid, oleic acid or stearic acid, esters, for example, fatty acid esters such as alkyl stearyl esters, e.g., methyl stearate; stearyl stearate, pentaerythritol tetrastearate, and the like, mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent, waxes such as beeswax, montan wax, paraffin wax, EBS wax, or the like. Such materials are generally used in amounts of about 0.1 to about 20 parts by weight, based on 100 parts by weight of the polymer portion of the composition.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat 6321 (Sanyo) or Pebax MH1657 (Atofina), Irgastat P18 and P22 (Ciba-Geigy). Other polymeric materials that can be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing can be used in a polymeric resin containing chemical antistatic agents to render the composition electrostatically dissipative. Antistatic agents are generally used in amounts of about 0.05 to about 20 parts by weight, based on 100 parts by weight of the polymer portion of the composition.

Dyes or pigments can be used to give a background coloration. Dyes are typically organic materials that are soluble in the resin matrix while pigments can be organic complexes or even inorganic compounds or complexes, which are typically insoluble in the resin matrix. These organic dyes and pigments include the following classes and examples: furnace carbon black, titanium oxide, zinc sulfide, phthalocyanine blues or greens, anthraquinone dyes, scarlet 3b Lake, azo compounds and acid azo pigments, quinacridones, chromophthalocyanine pyrrols, halogenated phthalocyanines, quinolines, heterocyclic dyes, perinone dyes, anthracenedione dyes, thioxanthene dyes, parazolone dyes, polymethine pigments and others.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.1 to about 20 parts by weight, based on 100 parts by weight of the polymer portion of the composition.

Suitable dyes are generally organic materials and include, for example, coumarin dyes such as coumarin 460 (blue), coumarin 6 (green), nile red or the like; lanthamide complexes; hydrocarbon and substituted hydrocarbon dyes; polycyclic aromatic hydrocarbon dyes; scintillation dyes such as oxazole or oxadiazole dyes; aryl- or heteroaryl-substituted poly (C2-8) olefin dyes; carbocyanine dyes; indanthrone dyes; phthalocyanine dyes; oxazine dyes; carbostyryl dyes; napthalenetetracarboxylic acid dyes; porphyrin dyes; bis (styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes are generally used in amounts of about 0.01 to about 20 parts by weight, based on 100 parts by weight of the polymer portion of the composition.

Where a foam is desired, suitable blowing agents include for example, low boiling halohydrocarbons and those that generate carbon dioxide; blowing agents that are solid at room temperature and when heated to temperatures higher than their decomposition temperature, generate gases such as nitrogen, carbon 25 dioxide ammonia gas, such as azodicarbonamide, metal salts of azodicarbonamide, 4,4' oxybis(benzenesulfonylhydrazide), sodium bicarbonate, ammonium carbonate, or the like, or combinations comprising at least one of the foregoing blowing agents. Blowing agents are generally used in amounts of about 0.01 to about 15 parts by weight, based on 100 parts by weight of the polymer portion of the composition.

The components of the composition are mixed under conditions of shear and temperature effective to produce the desired characteristics in the mixed composition, in particular improved tensile modulus and/or ductility. Without being bound by theory, it is believed that such improvements are achieved by in situ fibrillation of the fluoropolymer. Suitable mixing methods for achieving the desired shear and temperature conditions can be, for example, extrusion kneading, roll kneading, or mixing in a two-roll mill, a Banbury mixer, a single screw or twin-screw extruder, a double blade batch mixer, a vertical shaft mixer, a planetary mixer, a Becken blade mixer, a dispersion blade mixer, a sigma mixer, in continuous batch mixers of the hydrofoil, turbine blade, or CF impeller blade type, static mixers and the like devices, which are capable of imparting a controlled degree of shear. In one embodiment, a single screw or a twin-screw extruder is used. The twin-screw extruder can be co-rotating, counter rotating, intermeshing, non-intermeshing, or the like, for example a, planetary gear extruder readco continuous mixer. The mixing can be conducted in a continuous or a batch process. When melt blending or reactive melt blending is used, the mixing is generally conducted at a temperature and for a time effective to produce a molten mixture of a substantially homogenous composition. The process can be a continuous polymerization process wherein the said reaction is conducted in a continuous mode in a train of reactors of at least two in series or parallel. In an alternate embodiment, the process can be a batch polymerization process wherein the reaction is conducted in a batch mode in a single vessel or in multiple vessels and the reaction can be conducted in two or more stages depending on the number of reactors and the process conditions. In an alternate embodiment, the process can be carried out in a semi-continuous polymerization process where the reaction is carried out in a batch mode and the additives are added continuously. Alternatively, the reaction is conducted in a continuous mode where the polymer formed is removed continuously and the reactants or additives are added in a batch process. In an alternate embodiment, the product from at least one of the reactors can be recycled back into the same reactor intermittently by "pump around" to improve the mass transfer and kinetics of reaction. Alternatively, the reactants and the additives are stirred in the reactors with a speed of about 25 revolutions per minute (here in after "rpm") to about 2500 rpm.

The time, temperature, apparatus, component addition sequence and location (along an extruder, e.g.), and other conditions of mixing are accordingly selected so as to produce a composition having an improved modulus and elongation compared to compositions not containing both carboxy reactive compound and fluoropolymer. Those of ordinary skill in the art will be able to adjust the degree of shear and temperature, as well as other parameters, without undue additional experimentation using the guidance provided herein.

In one embodiment, the polymer compositions can be prepared by pre-combining the matrix polymer, fluoropolymer, and carboxy reactive compound prior to mixing under suitable conditions of temperature and shear, although such pre-combining is not necessary. The pre-combining may be carried out in any conventional mixer (e.g., drum mixer, ribbon mixer, vertical spiral mixer, Muller mixer, sigma mixer, chaotic mixer, static mixer, and the like). Pre-combining is typically carried out at a temperature below the degradation temperature of the matrix polymer, fluoropolymer, and any encapsulating polymer. Alternatively, a portion of the matrix polymer can be pre-combined with the fluoropolymer (with or without one or more additives) to prepare a masterbatch, and then the remaining matrix polymer can be added and mixed therewith later.

In general, suitable mixing (fibrillation) conditions include temperatures at or above the glass transition temperature of the matrix polymer and below the softening temperature of the fluoropolymer. The mixing temperature is also preferably below the degradation temperature of the matrix polymer. Suitable temperatures can be about 20° C. to about 450° C., more specifically about 50° C. to about 400° C., even more specifically about 100° C. to about 300° C. At these temperatures, processing can be conducted for about 2 seconds to about 10 hours, specifically about 3 seconds to about six hours.

In one embodiment of the present invention, a catalyst can be employed. The catalyst can be an acidic, or basic or a transition metal based catalyst. The catalyst can be any of the catalysts commonly used in the prior art such as alkaline earth metal oxides such as magnesium oxides, calcium oxide, barium oxide and zinc oxide; alkali and alkaline earth metal salts; a Lewis catalyst such as tin or titananium compounds; a nitrogen-containing compound such as tetra-alkyl ammonium hydroxides used like the phosphonium analogues, e.g., tetra-alkyl phosphonium hydroxides or acetates. The Lewis acid catalysts and the aforementioned metal oxide or salts can be used simultaneously. In one embodiment, the catalyst is not a tertiary amine or an alkali metal hydroxide.

The catalyst can be containing at least one selected from the group consisting of lithium salts, sodium salts, potassium salts, magnesium salts, calcium salts, zinc salts, and manganese salts of stearic acid and acetic acid. In one embodiment the catalyst can be selected from the group consisting of alkali metal carboxylates, alkaline-earth metal carboxylates, aluminium, zinc, and manganese carboxylates. The metals contained in the metal carboxylates include alkali metals, such as lithium, sodium, and potassium; alkaline-earth metals, such as magnesium, calcium, strontium, and barium; and other metals, such as aluminium, zinc, and manganese. In one embodiment, the catalyst can be alkali metal halides, alkali metal carboxylates, alkali metal enolates, amine hydrohalides, alkali metal carbonates and quaternary ammonium halides. The carboxylic acid for forming salts together with those metals can be either of monocarboxylic acids, dicarboxylic acids and other polycarboxylic acids, and also can be polymer-like carboxylic acids. The number of carbon atoms of the carboxylic acid is not particularly limited. However, the number of carbon atoms of the carboxylic acid is 1 or more, which influences the rate of crystallization of the highly polymerized polyester obtained. In one embodiment, the carboxylic acids of the carboxylates include aliphatic carboxylic acids having a carbon number in the range of 1 to 20, and particularly in the range of 1 to 10; alicyclic carboxylic acids having a carbon number in the range of 3 to 12; and aromatic carboxylic acids having a carbon number in the range of 7 to 20. Specifically, the carboxylic acids include acetic acid, propionic acid, butyric acid, caproic acid, adipic acid, stearic acid, palmitic acid, montanic acid, cyclohexanecarboxylic acid, benzoic acid, and phthalic acid.

In one embodiment, the catalyst can be lithium fluoride, lithium iodide, potassium bromide, potassium iodide, sodium dihydrogen phosphate, sodium acetate, sodium benzoate, sodium caproate, sodium stearate, sodium ascorbate and dodecyltrimethylammonium bromide and combinations thereof. In another embodiment, the metal catalysts may be selected from the group consisting of aluminum, bismuth, calcium, cesium, cobalt, chromium, iron, magnesium, manganese, nickel, tin, organotin, titanium, zinc, zirconium compounds. While a wide variety of catalysts can be used, organic titanates such as tetrabutyl titanate may used alone or in so combination with magnesium or calcium acetates. In yet another embodiment, the catalyst can be complex titanates, such as derived from alkali or alkaline earth metal alkoxides and titanate esters, inorganic titanates, such as lanthanum titanate, calcium acetate/antimony trioxide mixtures and lithium and magnesium alkoxides.

Inorganic catalysts include compounds such as the hydroxides, hydrides, amides, carbonates, phosphates, borates, carboxylates etc., of alkali metals such as sodium, potassium, lithium, cesium, etc., and of alkali earth metals such as calcium, magnesium, barium, etc., can be cited such as examples of alkali or alkaline earth metal compounds. Typical examples include sodium stearate, sodium carbonate, sodium acetate, sodium bicarbonate, sodium benzoate, sodium caproate, or potassium oleate.

Co-catalysts may also be added to the mixture. In one embodiment, the co-catalyst can be at least one selected from the group consisting halides, carbonates or bicarbonates of alkali metals or alkaline earth metals, such as lithium chloride, potassium iodide or potassium carbonate; and alkali metal salts or alkaline earth metal salts, such as lithium salt, sodium salt, potassium salt, beryllium salt, magnesium salt, calcium salt, strontium salt or barium salt of aryl- or alkyl-substituted phosphines, such as tributyl phosphine, trioctyl phosphine or triphenyl phosphine, saturated fatty acids, such as butyric acid, valeric acid, caproic acid, lauric acid, myristic acid, palmitic acid, stearic acid, behenic acid or montanic acid, or unsaturated fatty acids, such as crotonic acid, oleic acid or elaidic acid. The amounts of the catalyst can vary. In one embodiment the catalyst is present in a range from about 0.01 to 1.5 by weight of total composition.

In another embodiment, a catalyst quencher is added to the reaction mixture to quench any metal salts that can be present in the polyester. The choice of the quencher is essential to avoid color formation. In one embodiment of the invention, the catalyst quenchers are phosphorus containing derivatives, examples include but are not limited to diphosphites, phosphonates, metaphosphoric acid; arylphosphinic and arylphosphonic acids; polyols; carboxylic acid derivatives and combinations thereof. The amount of the quencher added to the thermoplastic composition is an amount that is effective to stabilize the thermoplastic composition. In one embodiment, the amount is at least about 0.001 weight percent, preferably at least about 0.01 weight percent, based on the total amount of the thermoplastic resin composition. The amount of quencher used is not more than the amount effective to stabilize the composition in order not to deleteriously affect the advantageous properties of said composition. In one embodiment, the amount can range from 0.001 or 0.01 weight percent, based on the total amount of the thermoplastic resin composition.

After mixing, the composition so formed can be made into a particulate form by techniques such as pelletizing or grinding. In one embodiment, the molten mixture from an extruder can be fed into a die. Some non-limiting examples of suitable dies include an annular die, coat hanger die, spiral mandrel die, crosshead die, T-die, fishtail die, spider die, single, or double roller die, or profile extrusion die.

Compositions of the present invention and articles derived from the composition can have useful properties. In an advantageous feature, compositions of the present invention and articles derived from the composition have a tensile modulus of about 2 GPa to about 12 GPa, specifically about 2.5 to about 7 GPa, where the tensile modulus can be determined in accordance with ISO 527 at room temperature, using a rate of pull of 1 mm/minute until 1% strain followed by 5 mm/minute until the sample breaks. In some embodiments, the improved modulus can be obtained without significant degradation of the other properties of the composition. In other embodiments, the improved modulus is obtained together with good ductility and/or good flow.

Compositions and articles derived from the compositions can also have good or improved ductility, as reflected by elongation at break, notched Izod impact, strength, and/or unnotched Izod impact strength. For example, a composition, or an article derived from the composition, can exhibit an elongation at break of greater than 20%. In another embodiment, the nominal elongation at break can be about 20 to about 150%. The unnotched impact strength, determined in accordance with ISO 180 at room temperature, of about 40.0 or higher (No break (NB)), specifically about 60 to NB, more specifically from about 100 to about 180 kilojoules per square meter ($KJ/m^2$). The compositions can have an notched impact strength, determined in accordance with ISO 180 at 23° C., of from about 4 to about 40 $kJ/m^2$.

In one embodiment, the compositions and articles derived from the compositions have good mechanical properties and good flow properties, in particular flow properties that render the compositions suitable for injection molding of thin wall parts (e.g., parts having a wall thickness of less than 2.5 mm, less than 2.0 mm, or even less than 1.5 mm). Flow properties for the molding of small parts may also be achieved, as well as flow properties for the molding of large parts such as automobile door panels, fenders, bumpers, and the like.

The melt blended compositions can be molded into useful articles by a variety of means, for example injection molding, extrusion molding, rotation molding, foam molding, calendar molding, blow molding, thermoforming, compaction, melt spinning, and the like, to form articles. In one embodiment, the articles are injection molded. Because of their advantageous mechanical characteristics, especially preferred are articles that will be exposed to ultraviolet (UV) light, whether natural or artificial, during their lifetimes, and most particularly outdoor and indoor articles. Suitable articles are exemplified by but are not limited to aircraft, automotive, truck, military vehicle (including automotive, aircraft, and waterborne vehicles), scooter, and motorcycle exterior and interior components, including panels, quarter panels, rocker panels, trim, fenders, doors, deck lids, trunk lids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; counter tops; protected graphics; outdoor and indoor signs; enclosures, housings, panels, and parts for automatic teller machines (ATM); computer; desk-top computer; portable computer; lap-top computer; palm-held computer housings; monitor; printer; keyboards; FAX machine; copier; telephone; phone bezels; mobile phone; radio sender; radio receiver; enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated painted articles; coated dyed articles; coated fluorescent articles; coated foam articles; and like applications. The invention further includes additional fabrication operations of such articles, including but not limited to molding, in-mold decoration, baking in a paint oven, lamination, and/or thermoforming. The articles made from the composition of the present invention can be used widely in automotive industry, home appliances, electrical components, and telecommunications.

Accordingly, the invention provides previously unavailable advantages of a balance combination of mechanical properties of impact and elongation for polyester compositions by employing a process of using appropriate carboxy reactive compounds in presence of a fibrillatable fluoropolymer. In one embodiment, the balance of the mechanical properties are obtained without the consequent loss or degradation of other desirable characteristics. Typically, it is difficult to obtain high modulus, good flow, and good ductility and impact strength in a particular polymer composition. In one embodiment, the improved modulus is obtained together with good ductility and/or good flow that render the compositions suitable for injection molding The invention is further described in the following illustrative examples in which all parts and percentages are by weight unless otherwise indicated.

EXAMPLES

Examples 1-8 and Comparative Examples 1-10

Materials

Table 1 provides the details of the materials and the source from where they were procured.

TABLE 1

| Abbreviation | | Source |
| --- | --- | --- |
| PBT 195 | Polybutylene Terephthalate, intrinsic viscosity of 0.7 cm³ per gram as measured using 60:40 phenol/tetrachloroethane mixture. | GE Plastics, USA |
| PET | Polyethylene Terephthalate, intrinsic viscosity of 0.7 cm³ per gram as measured using 60:40 phenol/tetrachloroethane mixture. | GE Plastics, USA |
| PTFE | Polytetrafluroethylene | — |
| TSAN | PTFE/SAN, synthesized by aqueous emulsion polymerization as disclosed in U.S. Pat. No. 5,804,654 | GE Plastics, USA |
| Johncryl ADR 4368S | Glycidal epoxy containing styrene acrylic copolymer | Johnson Polymers, now BASF |
| Coatosil 1770 | Cyclo aliphatic epoxy resin | GE Silicones, now Momentive Performance Materials Inc |
| PETS | Pentaerythritol terastearate | Cognis International |
| EEA | Ethylene Acrylate copolymer | Ashland Inc |

General Procedure/Techniques

The flexural modulus of the compositions was measured in accordance with ISO 178, at room temperature and the flexural strength of the compositions was measured in accordance with ISO 178, at room temperature with a pulling speed of 2 mm/min. Tensile Modulus (Mpa), tensile strength (Mpa) and elongation at break(%) were determined in accordance with ISO 527 at room temperature, using a rate of pull of 1 mm/minute until 1% strain followed by 5 mm/minute until the sample breaks. Tensile properties were tested according to ISO 527 on 150×10×4×mm (length×wide×thickness) injection molded bars at 23° C. with a crosshead speed of 5 mm/min. The Izod unnotched impact was measured at 23° C. with a pendulum of 5.5 Joule on 80×10×4 mm (length×wide× thickness) impact bars according to ISO 180 method. Flexural properties or three point bending were measured at 23° C. on 80×10×4 mm (length×wide×thickness) impact bars with a crosshead speed of 2 mm/min according to ISO 178. The heat distortion temperature (also known as HDT) test was performed by placing HDT samples at load of 0.45 MPa or 1.8 MPa and heating rate of 120° C./hr.

The components (amounts expressed in percent weight, based on the total weight of the polymer composition) shown in Table 2-5 were subjected to dry mixing, fed into a ZSK 25 co-rotating twin-screw extruder from WERNER and PFLEIDERER Coextruder, and mixed at a barrel temperature of about 240° C. to 275° C., maintaining a torque at 80 percent, and a screw rotation rate of 300 rotations per minute (rpm). The extrudate was then fed into a high-speed pelletizer.

The resulting pellets were dried for at least 4 hours at 80° C. before injection molding into mold suitable for the formation of ASTM/ISO test specimens. An L&T Demag De-Tech 60T LNC4-E injection molding machine was used, operated at a temperature of about 240° C.-275° C. The melt viscosity, tensile elongation, tensile modulus, tensile strength yield, tensile modulus break, Flexural modulus, Flexural strength, unnotched and notched Izod impact strength, HDT and Vicat were determined in accordance with the above ISO methods. "NB" in the following Tables means that the sample did not break, and may therefore be considered high impact.

Example 1 and Comparative Examples 1-3

Procedures/Techniques

Example 1

The general procedure described above was employed except that the polybutylene terephthalate along with the fluoropolymer (TSAN) and the carboxyl reactive compound (Coatosil 1770) was added to the extruder. COMPARATIVE

Examples 1-3

The general procedure described above was used and here the polybutylene terephthate was fed in to the extruder (Comparative Example 1). For the comparative examples 2 and 3, the polybutylene terephthalate was added along with the fluoropolymer (CEx.2) and polybutylene terephthalate was added with the carboxyl reactive compound coatosil 1770 (CEx.3) respectively to the extruder and the above general procedure was followed.

Results and Discussion

TABLE 2

| | CEx. 1 | CEx. 2 | CEx. 3 | Ex. 1 |
| --- | --- | --- | --- | --- |
| PBT195 (wt %) | 99.65 | 97.65 | 98.15 | 96.15 |
| Fluoropolymer (wt %) | — | 2 | — | 2 |
| Carboxy reactive compound: Coatosil (wt %) | — | — | 1.5 | 1.5 |

TABLE 2-continued

|  | CEx. 1 | CEx. 2 | CEx. 3 | Ex. 1 |
|---|---|---|---|---|
| Catalyst (wt %) | 0.05 | 0.05 | 0.05 | 0.05 |
| Additives (wt %) | 0.3 | 0.3 | 0.3 | 0.3 |
| Properties |  |  |  |  |
| Melt Viscosity at 25° C. (pa-s) | 66 | 79 | 97 | 152 |
| Tensile Elongation at 50 mm/min (%) | 5 | 6 | 15 | 83 |
| Izod Notched Impact (kJ/m$^2$) | 4 | 5 | 4 | 6 |
| Tensile Modulus at 50 mm/min (Mpa) | 2583 | 2943 | 2472 | 2831 |
| Tensile Strength, Yield (Mpa) | 59 | 61 | 56 | 57 |
| Tensile Strength, Break (Mpa) | 59 | 61 | 55 | 43 |
| Flexural Modulus (Mpa) | 2422 | 2668 | 2352 | 2610 |
| Flexural Strength (Mpa) | 87 | 95 | 78 | 87 |
| HDT, (° C.) | 65 | 64 | 55 | 59 |
| Vicat (° C.) | 182 | 193 | 186 | 188 |

From Table 2 it can be observed that addition of a combination of fluoropolymer and carboxy reactive compound to the polyester improves the melt viscosity of the composition to 152 pa-s (Ex.1) from a viscosity of 79 pa-s and 97 pa-s with only the fluoropolymer (CEx.2) or the carboxy reactive compound (CEx.3) respectively. An increase in the ductility/impact of the system, which is represented by increased elongation from 5-83 percent (Ex.1).

Example 2 and Comparative Examples 4-6

Procedures/Techniques

Example 2

The general procedure described above was employed except that the polyethylene terephthalate along with the fluoropolymer (TSAN) and the carboxyl reactive compound (Johncryl ADR 4368S) was added to the extruder.

Comparative Examples 4-6

The general procedure described above was used and here the polyethylene terephthalate was fed in to the extruder (Comparative Example 4). For the comparative examples 5 and 6, the polyethylene terephthalate was added along with the fluoropolymer (CEx.5) and polyethylene terephthalate was added with the carboxyl reactive compound Johncryl ADR 4368S (CEx.6) respectively to the extruder and the above general procedure was followed.

Results and Discussion

TABLE 3

|  | CEx. 4 | CEx. 5 | CEx. 6 | Ex. 2 |
|---|---|---|---|---|
| PET (wt %) | 98.09 | 96.09 | 97.09 | 95.09 |
| Fluoropolymer (wt %) | — | 2 | — | 2 |
| Carboxy reactive compound: Joncryl ADR 4368S (wt %) | — | — | 1 | 1 |
| Catalyst (wt %) | 0.06 | 0.06 | 0.06 | 0.06 |
| PETS* (wt %) | 1.2 | 1.2 | 1.2 | 1.2 |
| Properties |  |  |  |  |
| Melt Viscosity at 270° C. (pa-s) | 188 | 171 | 335 | 382 |
| Tensile Elongation at 50 mm/min (%) | 10 | 5 | 47 | 86 |
| Izod Unnotched Impact (kJ/m2) | 78 | 34 | NB* | NB* |
| Izod Notched Impact (kJ/m2) | 4 | 4 | 4 | 4 |
| Ductility (%) | 0 | 0 | 80 | 60 |

TABLE 3-continued

|  | CEx. 4 | CEx. 5 | CEx. 6 | Ex. 2 |
|---|---|---|---|---|
| HDT, (° C.) | 83 | 81 | 81 | 81 |
| Vicat (° C.) | 176 | 174 | 174 | 178 |

From Table 3 it can be noted that addition of the combination of fluoropolymer and carboxy reactive compound to the polyester increases the melt viscosity from 170 Pa·S to 380 Pa·S (Comparative Example 5 and Example 2), enhancing the ductility/impact of the system, which is represented by increased elongation from 5-86 percent. It may also be seen that addition of the carboxy reactive compound does not affect the Heat Distortion Temperature (HDT)/Vicat of the system.

Examples 3-8 and Comparative Examples 7-10

Procedures/Techniques

Examples 3-4

The general procedure described above was employed except that the polybutylene terephthalate along with the fluoropolymer (TSAN), filler and the carboxyl reactive compound was added to the extruder. However the type of carboxyl reactive compound employed in examples 3 and 4 was milled masterbatch of epoxy cresol novolac in EEA for example 3 and coatosil 1770 in the case of example 4 (refer Table 4).

Comparative Examples 7-8

The general procedure described above was used and here the polybutylene terephthate and the filler was fed in to the extruder (Comparative Example 7). For the comparative examples 8, the fluoropolymer (TSAN) was added along with the polybutylene terephthalate and filler (CEx.8) to the extruder and the above general procedure was followed.

Examples 5-8

The general procedure described above was employed except that the polyethylene terephthalate along with the fluoropolymer (TSAN), filler and the carboxyl reactive compound was added to the extruder. However the type of carboxyl reactive compound employed in examples 5-8 varied. While the carboxyl reactive compound used in examples 5 and 6 was Johncryl ADR 4368S, the examples 7 and 8 had milled masterbatch of epoxy cresol novolac in EEA as the carboxyl reactive compound. The amount of carboxyl reactive compound employed in examples 5-8 also varied as can be seen in Table 5.

Comparative Examples 9-10

The general procedure described above was used and here the polyethylene terephthalate and the filler were fed in to the extruder (Comparative Example 9). For the comparative examples 10, the fluoropolymer (TSAN) was added along with the polyethylene terephthalate and filler (CEx.10) to the extruder and the above general procedure was followed.

Results and Discussion

TABLE 4

|  | CEx. 7 | CEx. 8 | Ex. 3 | Ex. 4 |
|---|---|---|---|---|
| PBT195 (wt %) | 94.69 | 92.69 | 90.69 | 91.19 |
| Fluoropolymer (wt %) | — | 2 | 2 | 2 |
| Carboxy reactive compound (wt %) |  |  |  |  |
| Coatosil 1770 | — | — | — | 1.5 |
| Milled masterbatch of epoxy cresol novolac in EEA* | — | — | 2 | — |
| Filler (wt %) | 5 | 5 | 5 | 5 |
| Catalyst (wt %) | 0.05 | 0.05 | 0.05 | 0.05 |
| Antioxidant 1010* (wt %) | 0.06 | 0.06 | 0.06 | 0.06 |
| PETS* (wt %) | 0.2 | 0.2 | 0.2 | 0.2 |
| Properties |  |  |  |  |
| Melt Viscosity at 25° C. (pa-s) | 85 | 100 | 112 | 148 |
| Tensile Elongation at 50 mm/min (%) (Std Deviation) | 4 (0.3) | 3 (0.5) | 4 (0.7) | 17 (1.1) |
| Izod Unnotched Impact (kJ/m$^2$) (Std Deviation) | 57 (6) | 40 (2) | 72 (5) | 126 (9) |
| Izod Notched Impact (kJ/m$^2$) (Std Deviation) | 4 (1) | 4 (0) | 5 (0) | 6 (0) |
| Tensile Modulus at 50 mm/min (Mpa) | 3222 | 3663 | 3431 | 3552 |
| HDT, (° C.) | 65 | 79 | 71 | 71 |
| Vicat (° C.) | 194 | 194 | 191 | 193 |

TABLE 5

|  | CEx. 10 | CEx. 11 | Ex. 5 | Ex. 6 | Ex. 7 | Ex. 8 |
|---|---|---|---|---|---|---|
| PET | 92.79 | 90.79 | 89.79 | 90.04 | 89.29 | 88.79 |
| Fluoropolymer (wt %) | — | 2 | 2 | 2 | 2 | 2 |
| Carboxy reactive compound (wt %) |  |  |  |  |  |  |
| Joncryl ADR 4368S* | — | — | 1 | 0.75 | — | — |
| Milled masterbatch of epoxy cresol novolac in EEA* | — | — | — | — | 1.5 | 2 |
| Filler (ultra talc 609) (wt %) | 5 | 5 | 5 | 5 | 5 | 5 |
| Additive | 0.96 | 0.96 | 0.96 | 0.96 | 0.96 | 0.96 |
| Catalyst (wt %) | 0.05 | 0.05 | 0.05 | 0.05 | 0.05 | 0.05 |
| Properties |  |  |  |  |  |  |
| Melt Viscosity at 25° C. (pa-s) | 180 | 149 | 348 | 325 | 213 | 222 |
| Tensile Elongation at 50 mm/min (%) (Std Deviation) | 4 (0.0) | 5 (1.6) | 24 (9.7) | 14 (5.9) | 9 (4.4) | 8 (2.2) |
| Izod Unnotched Impact (kJ/m$^2$) (Std Deviation) | 90 (36) | 55 (3) | 85 (1) | 99 (7) | 121 (12) | 132 (4) |
| Izod Notched Impact (kJ/m$^2$) (Std Deviation) | 5 (0) | 6 (0) | 6 (0) | 7 (1) | 6 (1) | 6 (0) |
| Tensile Modulus at 50 mm/min (Mpa) | 3488 | 3826 | 3981 | 3906 | 3594 | 3474 |
| HDT, (° C.) | 84 | 83 | 82 | 82 | 82 | 81 |
| Vicat (° C.) | 178 | 177 | 174 | 176 | 175 | 169 |

Tables 4 and 5 indicate enhancement in the melt viscosity of the composition and increase in the impact and elongation at break when the combination of fluoropolymer and carboxy reactive compound is added to filled compositions. For example there is an increase in elongation from 4 pa s to almost 17 pa s (as seen from Table 4 Comparative Example 7 and Example 4), while the Izod value increases from 57 to almost 128 (as seen from Table 4 Comparative Example 7 and Example 4). In addition the modulus and heat properties (HDT/Vicat) of the compositions are not adversely affected (see Table 5 comparative example 10 and examples 5 to 8). Improvement in impact properties varies with type of carboxy reactive compound and amount of carboxy reactive compound used.

While the invention has been illustrated and described in typical embodiments, the foregoing description is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are within the spirit and scope of the invention as defined by the following claims.

What is claimed is:

1. A composition comprising, based on the total weight of the composition:
    a. from 60 to 99 weight percent of a polyester derived from a diol and a diacid,
    b. from 0.5 to 15 weight percent of a fluoropolymer, wherein the fluoropolymer comprises a homopolymer or copolymer comprising structural units derived from a fluorinated alpha-olefin monomer, or a fluorinated alpha-olefin monomer and a non-fluorinated monoethylenically unsaturated monomer, c. from 0.1 to 5 weight percent of a carboxy reactive compound selected from the group consisting of multifunctional epoxy compounds, epoxy silanes, imidazolines, oxazolines, reactive impact modifiers, and combinations thereof, d. optionally, from 0 to 40 weight percent of a thermoplastic resin with an intrinsic viscosity of greater than 0.8 dl/g, e. optionally, from 0 to 35 weight percent filler, f. optionally, an unreactive impact modifier, and g. optionally, a catalyst for the carboxy reactive compound, wherein the polyester, the fluoropolymer, and the carboxy reactive compound are present in sufficient amounts for the composition to have at least 20% higher impact strength as measured at ambient temperature in accordance with ISO 180 test method, and at least 20% higher tensile elongation at break as measured in accordance with ISO 527 test method, as compared to a composition containing the polyester and either the fluoropolymer or the carboxy reactive compound, and wherein the fluoropolymer is encapsulated and the encapsulating polymer is selected from the group consisting of styrene-acrylonitrile copolymers, acrylonitrile-butadiene-styrene copolymers, alpha-alkyl-styrene-acrylonitrile copolymers, alpha-methylstyrene-acrylonitrile copolymers, styrene-butadiene rubbers, and combinations thereof.

2. The composition of claim 1, wherein the diol is selected from the group consisting of ethylene glycol, propylene glycol, xylene glycol, butane diol, pentane diol, dipropylene glycol, 2-methyl-1,5-pentane diol, 1,6-hexane diol; dimethanol decalin, dimethanol bicyclo octane, cis- 1,4-cyclohexane dimethanol, trans-1,4-cyclohexane dimethanol, triethylene glycol, 1,10- decane diol, tricyclodecane dimethanol, hydrogenated bisphenol-A, tetramethyl cyclobutane diol, and combinations thereof.

3. The composition of claim 1, wherein the diacid is selected from the group consisting of linear acids, terephthalic acids, isophthalic acids, phthalic acids, naphthalic acids, cycloaliphatic acids, bicyclo aliphatic acids, decahydro naphthalene dicarboxylic acids, norbornene dicarboxylic acids, bicyclo octane dicarboxylic acids, 1,4-cyclohexanedicarboxylic acid, adipic acid, azelaic acid, dicarboxyl dodecanoic acid, stilbene dicarboxylic acid, succinic acid, and combinations thereof.

4. The composition of claim 1, wherein the polyester has an intrinsic viscosity in the range from 0.3 to 0.8 dl/g.

5. The composition of claim 1, wherein the polyester has an acid value of at least 15.

6. The composition of claim 1, wherein the fluoropolymer is fibrillatable.

7. The composition of claim 1, wherein the fluoropolymer comprises polytetrafluoroethylene, polyhexafluoropropylene, polyvinylidene fluoride, polychlorotrifluoroethylene, ethylene tetrafluoroethylene, fluorinated ethylene-propylene, polyvinyl fluoride, ethylene chlorotrifluoroethylene, or a combination of the foregoing polymers.

8. The composition of claim 1, wherein the fibrillatable fluoropolymer has a fribil diameter of 5 nanometers to 2 micrometers.

9. The composition of claim 1, wherein the fluoropolymer has a node to fibril fraction ratio of less than or equal to 0.9.

10. The composition of claim 1, wherein the carboxy reactive compound is selected from the group consisting of multifunctional epoxy compounds that consist only of carbon, oxygen and hydrogen, epoxy silanes, imidazolines, oxazolines, reactive impact modifiers, and combinations thereof.

11. The composition of claim 1, wherein the carboxy reactive compound is present in an amount ranging from 0.1 to 2 weight percent, based on the total weight of the composition.

12. The composition of claim 1, wherein the composition further comprises a thermoplastic resin with an intrinsic viscosity of greater than 0.8 dl/g.

13. The composition of claim 12, wherein the thermoplastic resin is selected from the group consisting of vinyl polymers, acrylic polymers, polyacrylonitriles, polystyrenes, polyolefins, polyurethanes, polyamides, polysulfones, polyimides, polyetherimides, polyphenylene ethers, polyphenylene sulfides, polyether ketones, polyether ether ketones, acrylonitrile-butadiene-styrene resins, polyethersulfones, poly(alkenylaromatic) polymers, polybutadienes, polyacetals, polycarbonates, polyphenylene ethers, ethylene-vinyl acetate copolymers, polyvinyl acetates, liquid crystal polymers, polyvinyl fluorides, polyvinylidene fluorides, or polyvinylidene chloride and combinations thereof.

14. The composition of claim 1, wherein the composition further comprises a filler.

15. The composition of claim 14, wherein the filler is selected from the group consisting of calcium carbonate, mica, talc, nanotalc, kaolin, talc, glass fibers, carbon fibers, carbon nanotubes, magnesium carbonate, sulfates of barium, calcium sulfate, titanium, nano clay, carbon black, silica, hydroxides of aluminum or ammonium or magnesium, zirconia, nanoscale titania, and combinations thereof.

16. The composition of claim 14, wherein the filler is present in an amount ranging from 0 to 35 weight percent filler, based on the total weight of the polyester composition.

17. The composition of claim 1, wherein the composition further comprises a unreactive impact modifier.

18. The composition of claim 1, wherein the polyester has an acid group and the mole ratio of carboxy reactive compound to the acid group ranges from 0.5 to 1.5.

19. The composition of claim 1, wherein the composition further comprises a catalyst for the carboxy reactive compound.

20. An article derived from the composition of claim 1.

21. An injection molded article derived from the composition of claim 1.

22. The composition of claim 1 wherein the polyester has an intrinsic viscosity in the range from 0.3 to 0.8 dl/g, the fluoropolymer is present in an amount of from 1 to 8 weight percent; and the carboxy reactive compound is present in an amount of from 0.2 to 2 weight percent.

23. A method to prepare a composition according to claim 1, comprising mixing the polyester, fluoropolymer and carboxy reactive compound to effectively form a composition having at least 20% higher impact strength as measured at ambient temperature in accordance with ISO 180 test method, and at least 20% higher tensile elongation at break as measured in accordance with ISO 527 test method, relative to a composition consisting of the polyester and only the fluoropolymer or the carboxy reactive compound.

24. The composition of claim 1, wherein the carboxy reactive compound is selected from the group consisting of acrylic and/or polyolefin copolymers and oligomers containing glycidyl groups incorporated as side chains, epoxy silanes, and epoxy cresol novolacs.

25. The composition of claim 1 wherein the thermoplastic composition is essentially free of chlorine and bromine.

26. A composition comprising, based on the total weight of the composition:

a. from 60 to 99 weight percent of a polyester derived from a diol and a diacid,
b. from 0.5 to 15 weight percent of a fluoropolymer, wherein the fluoropolymer comprises a homopolymer or copolymer comprising structural units derived from a fluorinated alpha-olefin monomer, or a fluorinated alpha-olefin monomer and a non-fluorinated monoethylenically unsaturated monomer,
c. from 0.1 to less than 5 weight percent of a carboxy reactive compound selected from the group consisting of epoxy silanes, imidazolines, oxazolines, reactive impact modifiers, multifunctional epoxy compounds that consist only of carbon, hydrogen, and oxygen, and combinations thereof,
d. optionally, from 0 to 40 weight percent of a thermoplastic resin with an intrinsic viscosity of greater than 0.8 dl/g,
e. optionally, from 0 to 35 weight percent filler,
f. optionally, an unreactive impact modifier, and
g. optionally, a catalyst for the carboxy reactive compound,
wherein the polyester, the fluoropolymer, and the carboxy reactive compound are present in sufficient amounts for the composition to have at least 20% higher impact strength as measured at ambient temperature in accordance with ISO 180 test method, and at least 20% higher tensile elongation at break as measured in accordance with ISO 527 test method, as compared to a composition containing the polyester and either the fluoropolymer or the carboxy reactive compound, and
wherein the fluoropolymer is encapsulated and the encapsulating polymer is selected from the group consisting of styrene-acrylonitrile copolymers, acrylonitrile-butadiene-styrene copolymers, alpha-alkyl-styrene-acrylonitrile copolymers, alpha-methylstyrene-acrylonitrile copolymers, styrene-butadiene rubbers, and combinations thereof.

27. A composition comprising, based on the total weight of the composition:
a. from 60 to 99 weight percent of a polyester derived from a diol and a diacid,
b. from 0.5 to 15 weight percent of a fluoropolymer, wherein the fluoropolymer comprises a homopolymer or copolymer comprising structural units derived from a fluorinated alpha-olefin monomer, or a fluorinated alpha-olefin monomer and a non-fluorinated monoethylenically unsaturated monomer, and
c. from 0.1 to about 2 weight percent of a carboxy reactive compound selected from the group consisting of acrylic and/or polyolefin copolymers and oligomers containing glycidyl groups incorporated as side chains, epoxy silanes, epoxy cresol novolacs, and combinations thereof,
d. optionally, from 0 to 40 weight percent of a thermoplastic resin with an intrinsic viscosity of greater than 0.8 dl/g,
e. optionally, from 0 to 35 weight percent filler,
f. optionally, an unreactive impact modifier, and
g. optionally, a catalyst for the carboxy reactive compound,
wherein the polyester, the fluoropolymer, and the carboxy reactive compound are present in sufficient amounts for the composition to have at least 20% higher impact strength as measured at ambient temperature in accordance with ISO 180 test method, and at least 20% higher tensile elongation at break as measured in accordance with ISO 527 test method, as compared to a composition containing the polyester and either the fluoropolymer or the carboxy reactive compound; and
wherein the fluoropolymer is encapsulated and the encapsulating polymer is selected from the group consisting of styrene-acrylonitrile copolymers, acrylonitrile-butadiene-styrene copolymers, alpha-alkyl-styrene-acrylonitrile copolymers, alpha-methylstyrene-acrylonitrile copolymers, styrene-butadiene rubbers, and combinations thereof.

* * * * *